US012135508B2

(12) United States Patent
Tsukada et al.

(10) Patent No.: US 12,135,508 B2
(45) Date of Patent: Nov. 5, 2024

(54) IMAGE FORMING APPARATUS

(71) Applicant: Brother Kogyo Kabushiki Kaisha, Nagoya (JP)

(72) Inventors: Takamasa Tsukada, Ichinomiya (JP); Junichi Yokoi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/486,312

(22) Filed: Oct. 13, 2023

(65) Prior Publication Data

US 2024/0111226 A1 Apr. 4, 2024

Related U.S. Application Data

(63) Continuation of application No. 17/935,216, filed on Sep. 26, 2022, now Pat. No. 11,809,094, which is a (Continued)

(30) Foreign Application Priority Data

Dec. 15, 2016 (JP) ................................ 2016-243132
Dec. 15, 2016 (JP) ................................ 2016-243134
(Continued)

(51) Int. Cl.
*G03G 21/16* (2006.01)
*G03G 15/04* (2006.01)

(52) U.S. Cl.
CPC ... *G03G 15/04054* (2013.01); *G03G 21/1647* (2013.01); *G03G 21/1666* (2013.01)

(58) Field of Classification Search
CPC ......... G03G 15/04054; G03G 21/1647; G03G 21/1666
See application file for complete search history.

(56) References Cited

U.S. PATENT DOCUMENTS 5,488,459 A 1/1996 Tsuda et al.
5,678,139 A 10/1997 Nomura et al.
(Continued)

FOREIGN PATENT DOCUMENTS

CN 102678752 A 9/2012
CN 103995448 A 8/2014
(Continued)

OTHER PUBLICATIONS

Jun. 14, 2018—(US) Non-Final Office Action—U.S. Appl. No. 15/843,349.

(Continued)

*Primary Examiner* — David J Bolduc
(74) *Attorney, Agent, or Firm* — Banner & Witcoff, Ltd.

(57) ABSTRACT

An image forming apparatus, having a photosensitive drum assembly, an exposure head, and a bearing, is provided. The photosensitive drum assembly includes a photosensitive drum and a flange disposed at an end of the photosensitive drum in an axial direction of an axis of the photosensitive drum. The flange contacts an inner surface of the photosensitive drum. The exposure head includes a plurality of light emitters aligned along the axial direction of the photosensitive drum, a lens array focusing light from the light emitters on the photosensitive drum, and a head frame to support the light emitters and the lens array. The bearing has a first contact face to contact the exposure head to define a distance between the lens array and the photosensitive drum along a direction of an optical axis of the light.

14 Claims, 10 Drawing Sheets

Related U.S. Application Data continuation of application No. 17/222,633, filed on Apr. 5, 2021, now Pat. No. 11,487,216, which is a continuation of application No. 16/727,546, filed on Dec. 26, 2019, now Pat. No. 10,996,584, which is a continuation of application No. 16/519,140, filed on Jul. 23, 2019, now Pat. No. 10,558,139, which is a continuation of application No. 16/257,803, filed on Jan. 25, 2019, now Pat. No. 10,372,057, which is a continuation of application No. 15/843,038, filed on Dec. 15, 2017, now Pat. No. 10,228,631.

(30) Foreign Application Priority Data

Dec. 15, 2016 (JP) ................................ 2016-243138
Dec. 15, 2016 (JP) ................................ 2016-243141

(56) References Cited

U.S. PATENT DOCUMENTS

| | | | |
|---|---|---|---|
| 5,697,022 | A | 12/1997 | Matsuda et al. |
| 5,739,900 | A | 4/1998 | Isobe |
| 5,867,751 | A | 2/1999 | Nomura et al. |
| 6,055,006 | A | 4/2000 | Murano |
| 6,801,232 | B2 | 10/2004 | Nagamine et al. |
| 7,116,925 | B2 | 10/2006 | Yamaguchi |
| 7,783,225 | B2 | 8/2010 | Fujiwara |
| 7,808,520 | B2 | 10/2010 | Nakajima |
| 7,982,761 | B2 | 7/2011 | Yokoi |
| 8,203,587 | B2 | 6/2012 | Mikami et al. |
| 8,698,860 | B2 | 4/2014 | Sugiyama et al. |
| 8,725,028 | B2 | 5/2014 | Imai |
| 8,755,715 | B2 | 6/2014 | Mori et al. |
| 2002/0018666 | A1 | 2/2002 | Noda et al. |
| 2002/0021347 | A1 | 2/2002 | Kitayama et al. |
| 2002/0149664 | A1 | 10/2002 | Nagamine et al. |
| 2003/0185588 | A1 | 10/2003 | Takami et al. |
| 2006/0176538 | A1 | 8/2006 | Hirayama et al. |
| 2007/0126852 | A1 | 6/2007 | Fukutome et al. |
| 2008/0031655 | A1 | 2/2008 | Kondo |
| 2008/0145099 | A1 | 6/2008 | Gilbertson |
| 2008/0145103 | A1 | 6/2008 | Honobe et al. |
| 2009/0169261 | A1 | 7/2009 | Yokoi |
| 2009/0202272 | A1 | 8/2009 | Nakashima |
| 2009/0220272 | A1 | 9/2009 | Mikami et al. |
| 2009/0256872 | A1 | 10/2009 | Yamakawa et al. |
| 2009/0274488 | A1 | 11/2009 | Sugiyama |
| 2009/0322850 | A1 | 12/2009 | Tamaru et al. |
| 2009/0322851 | A1 | 12/2009 | Yokoi et al. |
| 2010/0020155 | A1 | 1/2010 | Tamaru et al. |
| 2010/0020301 | A1 | 1/2010 | Sugiyama et al. |
| 2010/0054813 | A1 | 3/2010 | Tamaru et al. |
| 2010/0271639 | A1 | 10/2010 | Iijima |
| 2011/0064462 | A1 | 3/2011 | Abe et al. |
| 2011/0255905 | A1 | 10/2011 | Yokoi |
| 2012/0027450 | A1 | 2/2012 | Imai |
| 2012/0121289 | A1 | 5/2012 | Kamimura |
| 2012/0148292 | A1 | 6/2012 | Shimizu |
| 2012/0230729 | A1 | 9/2012 | Abe |
| 2012/0269552 | A1 | 10/2012 | Sato |
| 2012/0321348 | A1 | 12/2012 | Toriu et al. |
| 2013/0051834 | A1 | 2/2013 | Kamimura |
| 2013/0088558 | A1 | 4/2013 | Nakajima |
| 2013/0188989 | A1 | 7/2013 | Wakayama |
| 2013/0259521 | A1 | 10/2013 | Sugiyama |
| 2013/0278705 | A1 | 10/2013 | Nakamura et al. |
| 2013/0315625 | A1 | 11/2013 | Fujita et al. |
| 2014/0003840 | A1 | 1/2014 | Onishi et al. |
| 2014/0204167 | A1 | 7/2014 | Yokoi et al. |
| 2014/0232803 | A1 | 8/2014 | Kobayashi |
| 2014/0270845 | A1 | 9/2014 | Kawakami et al. |
| 2014/0270847 | A1 | 9/2014 | Uenishi et al. |
| 2015/0185679 | A1 | 7/2015 | Morishita |
| 2016/0013664 | A1 | 1/2016 | Maekawa et al. |
| 2016/0026111 | A1 | 1/2016 | Arasawa et al. |
| 2016/0313664 | A1 | 10/2016 | Kaneto |
| 2017/0108816 | A1 | 4/2017 | Kawakami et al. |
| 2018/0364612 | A1 | 12/2018 | Ishidate et al. |

FOREIGN PATENT DOCUMENTS

| | | | |
|---|---|---|---|
| JP | H07-195734 | A | 8/1995 |
| JP | H09-174919 | A | 7/1997 |
| JP | 2000-168132 | A | 6/2000 |
| JP | 2002-014524 | A | 1/2002 |
| JP | 2002-361931 | A | 12/2002 |
| JP | 2005-014497 | A | 1/2005 |
| JP | 2006-084637 | A | 3/2006 |
| JP | 2006-301095 | A | 11/2006 |
| JP | 2007-271734 | A | 10/2007 |
| JP | 2008-207418 | A | 9/2008 |
| JP | 2009-012281 | A | 1/2009 |
| JP | 2009-119718 | A | 6/2009 |
| JP | 2009-122556 | A | 6/2009 |
| JP | 2009-157142 | A | 7/2009 |
| JP | 2009-208295 | A | 9/2009 |
| JP | 2010-006004 | A | 1/2010 |
| JP | 2010-008913 | A | 1/2010 |
| JP | 2011-016364 | A | 1/2011 |
| JP | 2011-079242 | A | 4/2011 |
| JP | 2012-003143 | A | 1/2012 |
| JP | 2012-025130 | A | 2/2012 |
| JP | 2012-103621 | A | 5/2012 |
| JP | 2012-189619 | A | 10/2012 |
| JP | 2013-011709 | A | 1/2013 |
| JP | 2013-022837 | A | 2/2013 |
| JP | 2013-203039 | A | 10/2013 |
| JP | 2013-205765 | A | 10/2013 |
| JP | 2013-228604 | A | 11/2013 |
| JP | 2014-021156 | A | 2/2014 |
| JP | 2014-159086 | A | 9/2014 |
| JP | 2014-178461 | A | 9/2014 |
| JP | 2016-203544 | A | 12/2016 |

OTHER PUBLICATIONS

Oct. 19, 2018—(US) Final Office Action—U.S. Appl. No. 15/843,349.
Oct. 27, 2020—(JP) Notice of Reasonse for Refusal—App 2016-243138, Eng Tran.
Nov. 4, 2020—(JP) Notice of Reasonse for Refusal—App 2016-243030, Eng Tran.
Nov. 24, 2020—(JP) Notice of Reasons for Refusal—App 2016-243132, Eng Tran.
Dec. 1, 2020—(JP) Notice of Reasons for Refusal—App 2016-243134, Eng Tran.
Dec. 1, 2020—(JP) Notice of Reasons for Refusal—App 2016-243141, Eng Tran.
May 24, 2021—(CN) Notification of First Office Action—App 201711347190.4, Eng Tran.
Apr. 19, 2021—(CN) Notification of First Office Action—App 201711346764.6, Eng Tran.
Apr. 26, 2021—(CN) Notification of First Office Action—App 201711347802.X, Eng Tran.
Oct. 19, 2021—(CN) Notification of the Second Office Action—App 201711346764.6, Eng Tran.
Jun. 28, 2022—(JP) Notice of Reasons for Refusal—JP App 2021-119395, Eng Tran.
Aug. 30, 2022—(JP) Notice of Reasons for Refusal—App 2021-191910, Eng Tran.
Sep. 19, 2023—(JP) Notice of Reasons for Refusal—JP App 2022-170446, Eng Tran.
Sep. 17, 2024—(JP) Nofice of Reasons for Refusal—JP App 2024-023496, Eng Tran.

IMAGE FORMING APPARATUS

REFERENCE TO RELATED APPLICATIONS

This application is a continuation of prior U.S. application Ser. No. 17/935,216, filed Sep. 26, 2022, which is a continuation of prior U.S. application Ser. No. 17/222,633, filed Apr. 5, 2021, now U.S. Pat. No. 11,487,216, which is a continuation of prior U.S. application Ser. No. 16/727,546, filed Dec. 26, 2019, now U.S. Pat. No. 10,996,584, which is a continuation of prior U.S. application Ser. No. 16/519,140, filed Jul. 23, 2019, now U.S. Pat. No. 10,558,139, which is a continuation of prior U.S. application Ser. No. 16/257,803, filed Jan. 25, 2019, now U.S. Pat. No. 10,372,057, which application is a continuation of prior U.S. application Ser. No. 15/843,038, filed Dec. 15, 2017, now U.S. Pat. No. 10,228,631, which claims priority under 35 U.S.C. § 119 from Japanese Patent Applications Nos. 2016-243132, 2016-243134, 2016-243138, and 2016-243141, all filed on Dec. 15, 2016. The entire subject matters of the applications are incorporated herein by reference.

BACKGROUND ART

Technical Field

Aspects of the present disclosure are related to a drum unit having a photosensitive drum, which is exposable to light from light emitters mounted in an exposure head; to an image forming apparatus having the drum unit and the exposure head; and to a method to manufacture the image forming apparatus.

Related Art

An image forming apparatus having a photosensitive drum, an LED head to expose the photosensitive drum to light, and a spacer arranged between a surface of the photosensitive drum and the LED head, is known. The LED head may be arranged to contact the spacer so that a gap between the LED head and the photosensitive drum may be maintained at a correct amount, and a focal point for the LED head may be maintained at a correct position on the photosensitive drum.

The image forming apparatus may have a bearing to rotatably support the photosensitive drum, and the LED head may be arranged to contact the bearing through the spacer in order to maintain the gap between the LED head and the photosensitive drum at the correct amount, and to correctly maintain the focal point for the LED head at the position on the photosensitive drum.

The LED head may have a plurality of LEDs, a lens array to focus the light from the LEDs on the photosensitive drum, and a frame to support the LEDs and the lens array. The frame of the LED head may be urged against the spacer to maintain the gap between the LED head and the photosensitive drum at the correct amount, and to maintain the focal point for the LED head at the correct position on the photosensitive drum.

Further, the image forming apparatus may have an eccentric cam arranged between the spacer and the LED head. A position of the focal point for the LED head on the photosensitive drum may be adjusted by rotating the eccentric cam.

DESCRIPTION

In the known image forming apparatuses, obstacles such as toner on the surface of the photosensitive drum may enter a gap between the spacer and the photosensitive drum or a gap between the spacer and the LED head and may cause deviation of the focal point from the correct position.

Further, in the image forming apparatus having the bearing to contact the LED head, while the photosensitive drum rotates, the bearing to support the rotating photosensitive drum may vibrate in a rotating direction of the photosensitive drum. If the bearing contacting the LED head vibrates in the rotating direction, the focal point for the LED head may deviate.

Moreover, while the frame to support the lens array may be urged against the spacer, the frame may be subject to a substantial amount of pressure, which may cause deformation in the frame and in the lens array.

While the position of the focal point may be adjusted by rotation of the eccentric cam, adjustment of the position of the focal point may require a worker to measure the position of the focal point for the LED head and rotate the eccentric cam simultaneously, which may cause a cumbersome burden on the worker.

The present disclosure is advantageous in that a drum unit and an image forming apparatus, in which deviation of a focal point for an exposure head may be restrained, and the position of the focal point for the exposure head may be adjusted easily, are provided. Further, the present disclosure is advantageous in that a drum unit and an image forming apparatus, in which a bearing to rotatably support the photosensitive drum and to contact the LED head may be restrained from vibrating, so that deviation of the focal point for the exposure head may be restrained, are provided. Furthermore, the present disclosure is advantageous in that an image forming apparatus having an exposure head with a plurality of light emitters, in which a lens array to focus light from the light emitters may be restrained from being deformed, is provided.

According to an aspect of the present disclosure, an image forming apparatus, including a photosensitive drum assembly, an exposure head, and a bearing, is provided. The photosensitive drum assembly includes a photosensitive drum and a flange disposed at an end of the photosensitive drum in an axial direction of an axis of the photosensitive drum. The flange contacts an inner surface of the photosensitive drum. The exposure head includes a plurality of light emitters aligned along the axial direction, a lens array focusing light from the light emitters on the photosensitive drum, and a head frame to support the light emitters and the lens array. The bearing includes a first contact face to be in contact with the exposure head to define a distance between the lens array and the photosensitive drum along a direction of an optical axis of the light.

According to another aspect of the present disclosure, an image forming apparatus, including a drum unit and an exposure head, is provided. The drum unit includes a photosensitive drum. The exposure head includes a plurality of light emitters aligned along a direction of a rotation axis of the photosensitive drum, a lens array focusing light from the light emitters on the photosensitive drum, a head frame supporting the light emitters and the lens array, the head frame having a reference face facing toward the rotation axis, a solid spacer having a first face, which faces toward the reference face, and a second face, which contacts the drum unit, and a sheet-like spacer interposed between the reference face and the first face.

According to another aspect of the present disclosure, a method to manufacture an image forming apparatus is provided. The image forming apparatus includes a drum unit and an exposure head. The exposure head includes a plurality of light emitters aligned along a direction of a rotation axis of the photosensitive drum, a lens array focusing light from the light emitters on the photosensitive drum, a head frame supporting the light emitters and the lens array, the head frame having a reference face facing toward the rotation axis, a solid spacer having a first face, which faces toward the reference face, and a second face, which contacts the drum unit, and a sheet-like spacer interposed between the reference face and the first face. The method includes obtaining a position of a focal point of the exposure head with respect to the reference face and a length between the first face and the second face in a direction of an optical axis of the light from the light emitters, determining the sheet-like spacer to be adopted based on the obtained position of the focal point and the obtained length, and assembling the adopted sheet-like spacer into the exposure head at the position between the reference face and the first face.

Hereinafter, an embodiment of the present disclosure will be described with reference to the accompanying drawings. An overall configuration and a detailed configuration of a color printer 1 being an example of an image forming apparatus will be described in the following paragraphs.

In the following description, directions related the color printer 1 and each part or item included in the color printer 1 will be mentioned on basis of a user's position to ordinarily use the color printer 1. For example, in FIG. 1, a viewer's left-hand side and right-hand side will be referred to as the user's frontward side and rearward side, respectively. A viewer's nearer side and farther side in FIG. 1 will be referred to as a rightward side and a leftward side for the user to use the color printer 1, respectively. An up-to-down or down-to-up direction in FIG. 1 may be referred to as a vertical direction, and a front-to-rear or rear-to-front direction may be referred to as a front-rear direction. Further, a left-to-right or right-to-left direction may be referred to as a widthwise direction.

Figure 1:
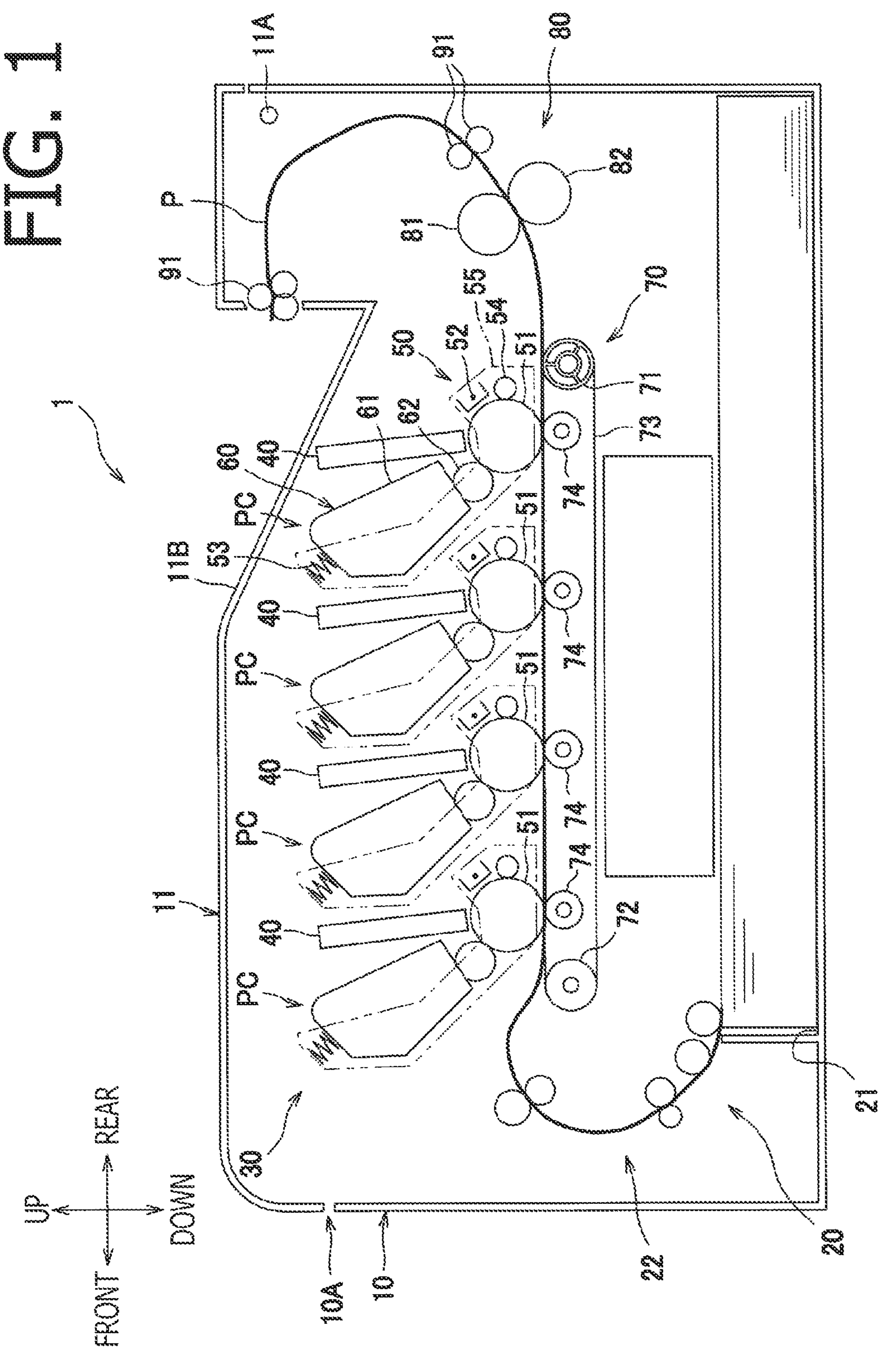
FIG. 1 is an illustrative cross-sectional view of a color printer according to an embodiment of the present disclosure.

As shown in FIG. 1, the color printer 1 includes a main housing 10, a top cover 11, a sheet feeder 20, and an image forming unit 30. The sheet feeder 20 and the image forming unit 30 are accommodated in the main housing 10.

Figure 2:
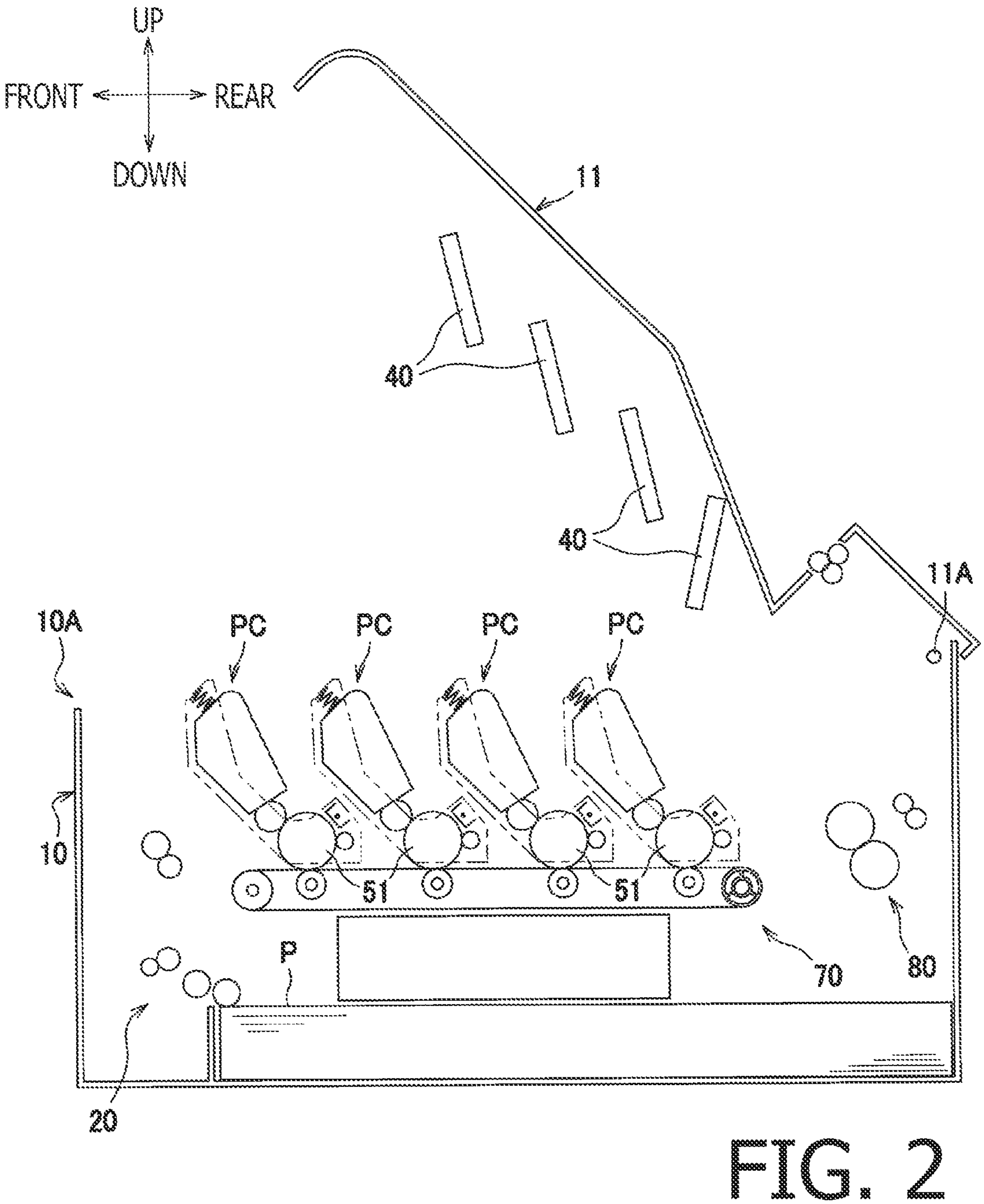
FIG. 2 is an illustrative cross-sectional view of the color printer, with a top cover being open, according to the embodiment of the present disclosure.

The top cover 11 is arranged at an upper position with respect to the main housing 10. The top cover 11 is pivotable with respect to the main housing 10 about a pivot axis 11A, which is located at a rearward side, to open or close an opening 10A formed at an upper area in the main housing 10. The top cover 11 is movable between a closure position (see FIG. 1), in which the top cover 11 closes the opening 10A, and an open position (see FIG. 2), in which the top cover 11 opens the opening 10A.

The sheet feeder 20 is arranged at a lower position in the main housing 10. The sheet feeder 20 includes a feeder tray 21 to store sheets P and a feeder device 22 to feed the sheets P to the image forming unit 30. The sheets P in the feeder tray 21 may be separated from one another by the feeder device 22 and fed to the image forming unit 30.

The image forming unit 30 includes a plurality of, e.g., four (4), exposure heads 40, a plurality of, e.g., four (4), process cartridges PC, a transfer unit 70, and a fuser unit 80. In the following description, two or more identical items may be represented by one of them, and description of the other identical item(s) may be omitted. For example, description of the four exposure heads 40 may be represented by one of the exposure heads 40, and description of the other three (3) exposure heads 40 may be omitted.

Each exposure head 40 includes a plurality of LEDs at one end thereof and is held at the other end by the top cover 11, more specifically, a holder 12 which will be described later in detail, to hang down from the top cover 11. The exposure head 40 is arranged to face one of four (4) photosensitive drums 51A from above when the top cover 11 is in the closure position. In particular, the exposure head 40 is movable, along with the top cover 11, between an exposable position (see FIG. 1), in which the photosensitive drum 51A may be exposed to light from the exposure head 40, and a retracted position (see FIG. 2), in which the exposure head 40 is apart farther from the photosensitive drum 51A than the exposure head 40 being in the exposable position. The LEDs in the exposure head 40 may blink on or off selectively based on image data so that a surface of the photosensitive drum 51A may be exposed to the light from the LEDs. Detailed configuration of the exposure head 40 will be described later.

The process cartridges PC are arranged between the top cover 11 and the feeder tray 21 to align along the front-rear direction. Each process cartridge PC is attachable to and detachable from the main housing 10 through the opening 10A when the top cover 11 is in the open position (see FIG. 2). The process cartridge PC includes a drum unit 50 and a developing cartridge 60 which is attachable to and detachable from the drum unit 50.

The drum unit 50 includes a photosensitive drum assembly 51, which includes the photosensitive drum 51A having a cylindrical shape, a charger 52 to charge the photosensitive drum 51A, an expandable spring 53 to urge the developing cartridge 60 toward the photosensitive drum 51A, a cleaning roller 54, and a drum frame 55 to support the photosensitive drum assembly 51 and other parts. Detailed configuration of the photosensitive drum assembly 51 will be described later.

The cleaning roller 54 is a roller to remove obstacles such as residual toner from the photosensitive drum 51A. The cleaning roller 54 contacts the photosensitive drum 51A and is rotatable on the photosensitive drum 51A.

The developing cartridge 60 includes a toner container 61 to contain toner and a developing roller 62 to supply the toner from the toner container 61 to the photosensitive drum 51A. The developing roller 62 is movable in a radial direction of the photosensitive drum 51A.

In particular, the developing roller 62 may rotate while the expandable spring 53 urges the developing roller 62 against the photosensitive drum 51A. While being urged by the expandable spring 53, the developing roller 62 may move in the radial direction of the photosensitive drum 51A to follow eccentric behaviors of the developing roller 62 and of the photosensitive drum 51A. Thus, an urging force of the expandable spring 53 may act in an intermediate area between the photosensitive drum 51A and the developing roller 62 to absorb the eccentricity, and the toner may be supplied to an electrostatic latent image on the photosensitive drum 51A stably.

The transfer unit 70 is arranged between the feeder tray 21 and the process cartridges PC. The transfer unit 70 includes a driving roller 71, a driven roller 72, a conveyer belt 73 being an endless belt strained around the driving roller 71 and the driven roller 72, and four (4) transfer rollers 74. The conveyer belt 73 is in such an arrangement that an outer surface of the conveyer belt 73 contacts the photosensitive drums 51A, and the transfer rollers 74 are arranged on an inner side of the conveyer belt 73 to nip the conveyer belt 73 with the photosensitive drums 51A.

The fuser unit 80 is arranged at a position rearward from the process cartridges PC and the transfer unit 70. The fuser unit 80 includes a heat roller 81 and a pressure roller 81 arranged to face the heat roller 81. The pressure roller 82 is pressed against the heat roller 81.

In the image forming unit 30 configured as above, the surfaces of the photosensitive drums 51A may be evenly charged by the chargers 52 and selectively exposed to the light from the exposure heads 40 so that electrostatic latent images based on the image data may be formed on the photosensitive drums 51A. Thereafter, the toner may be supplied from the developing rollers 62 to the photosensitive drums 51A so that the electrostatic latent images may be developed to be visible toner images on the photosensitive drums 51A.

The toner images formed on the photosensitive drums 51A may be transferred consecutively onto the sheet P being conveyed on the conveyer belt 73 in layers by the transfer rollers 74. The sheet P with the transferred toner images may be conveyed through a position between the heat roller 81 and the pressure roller 82 so that the toner images may be thermally fixed on the sheet P. The sheet P may be ejected by the conveyer roller 91 outside the main housing 10 and rest on an ejection tray 11B formed on top of the top cover 11.

Figure 3:
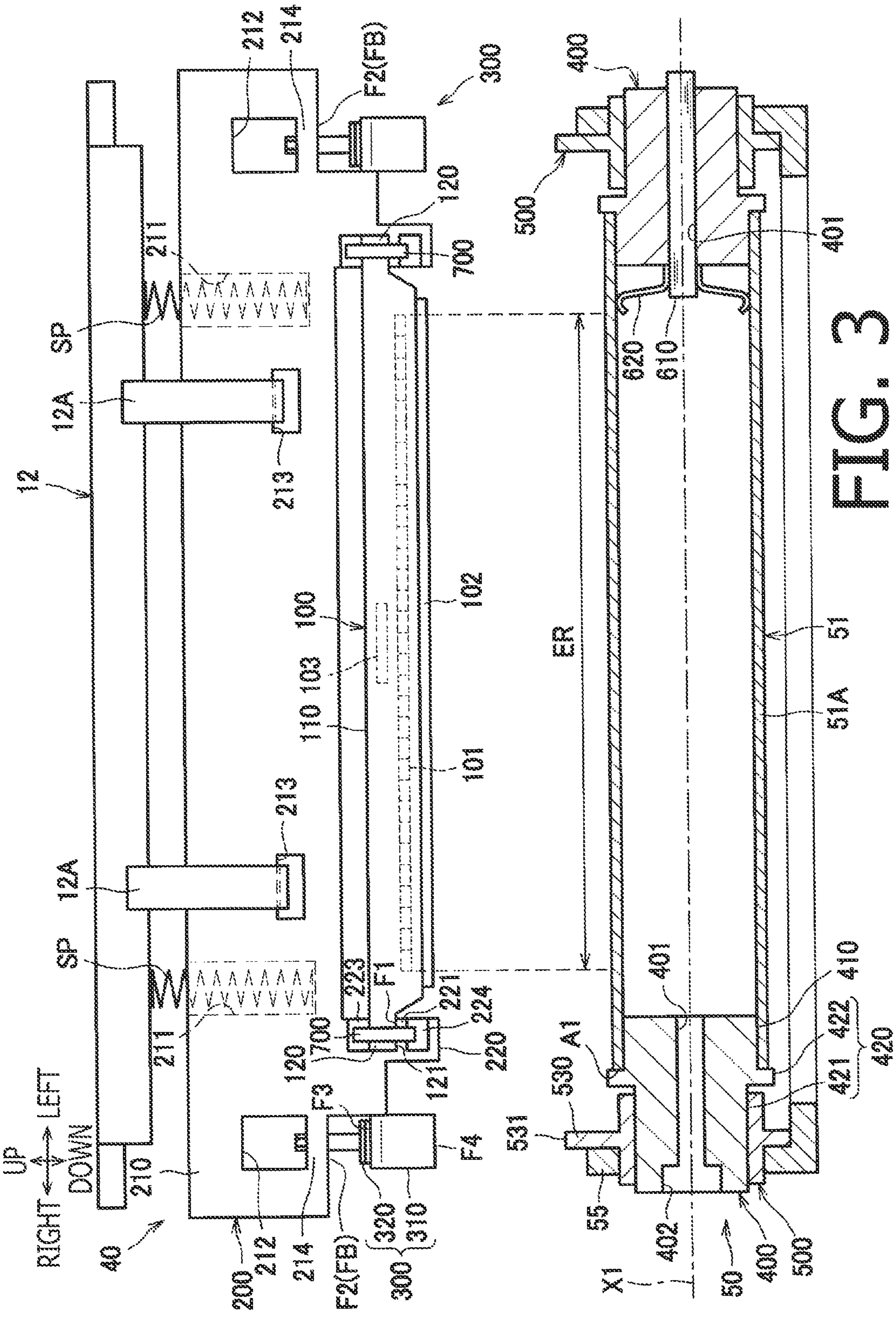
FIG. 3 is an illustrative view of an exposure head being at a retracted position and a drum unit according to the embodiment of the present disclosure.

Next, described below will be a structure neighboring the photosensitive drum assembly 51 including the photosensitive drums 51A and a configuration of the exposure heads 40. The photosensitive drum 51A as shown in FIG. 3 is rotatable about a rotation axis X1, which extends in the widthwise direction. In the following description, the direction of the rotation axis X1, i.e., the widthwise direction, to the photosensitive drum 51A may be referred to as a rotation axis direction.

The photosensitive drum assembly 51 is rotatably supported by bearings 500 at one and the other end portions thereof with regard to the rotation axis direction. The bearings 500 are arranged at axial end areas of the photosensitive drum assembly 51 on one side and the other side along the rotation axis direction and are supported by the drum frame 55.

The photosensitive drum assembly 51 includes the photosensitive drum 51A, which is in a cylindrical shape, and two (2) flanges 400, which are fitted to an inner circumferential surface of the photosensitive drum 51A. The photosensitive drum 51A may be made of a conductive material such as metal. On an outer circumferential surface of the photosensitive drum 51A, formed is a photosensitive layer. The outer circumferential surface of the photosensitive drum 51A including the photo sensitive layer may be referred to as the surface of the photosensitive drum 51A. The photosensitive layer is formed at least in a range larger than an exposable range ER of the exposure head 40.

One and the other of the flanges 400 are arranged in end areas in the photosensitive drum 51A on one side and the other side with regard to the rotation axis direction, respectively. The flanges 400 are made of resin. The flanges 400 are fitted to the inner circumferential surface of the photosensitive drum 51A and are rotatable along with the photosensitive drum 51A. Each flange 400 includes an inner portion 410 and an outer portion 420, which are formed integrally. The inner portion 410 is arranged on an inner side of an end face A1 of the photosensitive drum 51A with regard to the rotation axis direction. The outer portion 420 is arranged on an outer side of the end face A1 of the photosensitive drum 51A with regard to the rotation axis direction.

The inner portion 410 is formed in an approximate shape of a cylinder. The inner portion 410 is fitted to the inner circumferential surface of the photosensitive drum 51A and arranged outside the exposable range ER of the exposure head 40 with regard to the rotation axis direction.

The outer portion 420 includes a cylinder portion 421, which is supported by the bearing 500, and a circular flange portion 422, which protrudes outward in the radial direction of the photosensitive drum 51A from an outer circumferential surface of the cylinder portion 421. The cylinder portion 421 is formed in an approximate shape of a cylinder. An outer diameter of the cylinder portion 421 is smaller than an outer diameter of the photosensitive drum 51A.

The circular flange portion 422 is formed in an approximate shape of a disc. The circular flange portion 422 is arranged between the cylinder portion 421 and the inner portion 410 along the rotation axis direction. The circular flange portion 422 is arranged to contact the end face A1 of the photosensitive drum 51A. An outer diameter of the circular flange portion 422 is greater than the outer diameter of the photosensitive drum 51A.

The flange 400 has a through hole 401, which is formed through the flange 400 along the rotation axis direction. In particular, the through hole 401 is formed through the flange 400 along the rotation axis direction between an inward end face of the inner portion 410 and an outward end face of the outer portion 420. The through hole 401 is formed at a center of the inner portion 410 and a center of the outer portion 420.

One of the two flanges 400, e.g., the flange 400 on the left, may have a drum coupler 402, to which a rotating driving force may be input. The drum coupler 402 is formed to dent inward along the rotation axis direction in a non-circular shape in a view along the rotation axis direction. An outer coupler (not shown), which is extendable from and retractable to the main housing 10, may be extended from the main housing 10 and fitted in the drum coupler 402. The drum coupler 402 and the outer coupler may engage with each other along a rotating direction of the photosensitive drum 51A so that the rotating driving force may be transmitted through the outer coupler to be input to the drum coupler 402.

In the other of the two flanges 400, e.g., the flange 400 on the right, arranged in the through hole 401 may be a shaft 610 made of metal. The shaft 610 is arranged at a rotation center of the flange 400. A length of the shaft 610 in the rotation axis direction is smaller than a length of the photosensitive drum 51A in the rotation axis direction. Meanwhile, the length of the shaft 610 in the rotation axis direction is greater than a length of the flange 400 in the rotation axis direction. Axial ends of the shaft 610 protrude outward from the inward and outward end faces of the flange 400 along the rotation axis direction.

On an inner one of the axial ends of the shaft 610 along the rotation axis direction, arranged is a ground spring 620 made of metal. The ground spring 620 is arranged to contact an outer circumferential surface of the shaft 610 and the inner circumferential surface of the photosensitive drum 51A. Therefore, the shaft 610 is electrically connected with the photosensitive drum 51A through the ground spring 620 and, when the photosensitive drum assembly 51 is attached to the main housing 10, conductive with metal parts arranged in the main housing 10 to be connected to the ground potential.

Each of the bearings 500 supports the outer circumferential surface of the cylinder portion 421 in the flange 400 rotatably. The bearing 500 is made of resin and includes a sleeve bearing. The bearing 500 is arranged on an outer side of the photosensitive drum 51A along the rotation axis direction.

The bearing 500 includes a first contact face 531, which may contact the exposure head 40. The first contact face 531 is located on an outer side of the surface of the photosensitive drum 51A with regard to the radial direction. In particular, the first contact face 531 protrudes radially outward to be closer to the exposure head 40 than an outer circumferential surface of the circular flange portion 422 in the flange 400. A configuration of the bearing 500 will be described later in detail.

The exposure head 40 includes a first frame 100 and a second frame 200, which are assembled together as an example of a head frame to support optical members and light emitters described below. The exposure head 40 further includes gap-adjusting members 300 arranged between the second frame 200 and the drum unit 50. In particular, each gap-adjusting member 300 is arranged between the second frame 200 and the bearing 500 in the drum unit 50.

The first frame 100 and the second frame 200 are made of resin. The first frame 100 includes a base portion 110 and two (2) extended portions 120, which are formed integrally. The base portion 110 is made of resin and extends approximately in a rectangular shape longer in the widthwise direction. The extended portions 120 extend outward in the widthwise direction from widthwise end faces of the base portion 110. The base portion 110 is made of resin and is open vertically.

Inside the base portion 110, arranged are an LED array 101 and a memory 103 storing information concerning positions of focal points. At a lower opening of the base portion 110, arranged is a lens array 102, through which light from the LED array 101 may be focused on the surface of the photosensitive drum 51A. In other words, the base portion 110 supports the LED array 101, the lens array 102, and the memory 103. A lower face of the lens array 102 is a face, through which the light is emitted, and faces toward the rotation axis X1.

The LED array 101 is a semiconductor device including a plurality of light emitters (unsigned), which align along the rotation axis direction. The light emitters may emit light at the photosensitive drum 51A to scan the surface of the photosensitive drum 51A. In the following description, a direction, along which the plurality of light emitters align to scan the photosensitive drum 51A along the rotation axis direction, may be referred to as a main scanning direction. Meanwhile, a direction of an optical axis of the light emitted from the LED array 101 may be referred to as an optical axis direction. The optical axis direction coincides with a direction extending through any one of the light emitters and a position of a focal point on the photosensitive drum 51A for the one of the light emitters. A direction orthogonal to the optical axis direction and to the main scanning direction may be referred to as a sub-scanning direction. In this regard, the sub-scanning direction may coincide with the front-rear direction in the present embodiment, and the optical axis direction may coincide with the vertical direction.

A dimension of each extended portion 120 in the vertical direction is smaller than a dimension of the base portion 110 in the vertical direction. The extended portion 120 is located at an upper position on a widthwise end face of the base portion 110. A lower face of the extended portion 120 forms a supported face 121, at which the first frame 100 is supported by the second frame 200. The supported face 121 faces toward the rotation axis X1.

The second frame 200 supports the first frame 100 and is made of resin. The second frame 200 hangs down from the holder 12, which is made of resin and supported swingably by the top cover 11, to be supported by the holder 12. The second frame 200 has a base portion 210, which extends approximately in a rectangular shape longer in the widthwise direction, and two (2) protrusive portions 220, which support end areas of the first frame 100 with regard to the rotation axis direction.

The base portion 210 includes a first recess 211, a second recess 212, and a hole 213. The hole 213 includes two (2) holes 213, which are formed at positions spaced apart from each other symmetrically with respect to a widthwise center of the base portion 210 along the widthwise direction. The holes 213 are formed through the base portion 210 in the front-rear direction.

Meanwhile, the holder 12 includes hooks 12A to be hooked with the base portion 210 at positions coincident with the holes 213. A lower end of each hook 12A protrudes inward with regard to the front-rear direction to be engaged with the hole 213.

The first recess 211 is open toward the holder 12. The first recess 211 includes two (2) first recesses 211, one and the other of which are formed at positions on one and the other outer sides of the holes 213 with regard to the widthwise direction, respectively. In a position between a bottom of each first recess 211 and the holder 12, arranged is a compressive coil spring SP, which may urge the exposure head 40 toward the photosensitive drum 51A.

The second recess 212 is open toward one side in the front-rear direction. The second recess 212 includes two (2) second recesses 212, one and the other of which are formed at positions on one and the other outer sides of the first recesses 211 with regard to the widthwise direction, respectively. The one and the other of the second recesses 211 are formed at positions closer to one and the other of widthwise ends of the base portion 210 than a widthwise center of the base portion 210, respectively. A lower wall forming a bottom of each second recess 212 serves as a supporting wall 214 to support the gap-adjusting member 300.

Figure 4:
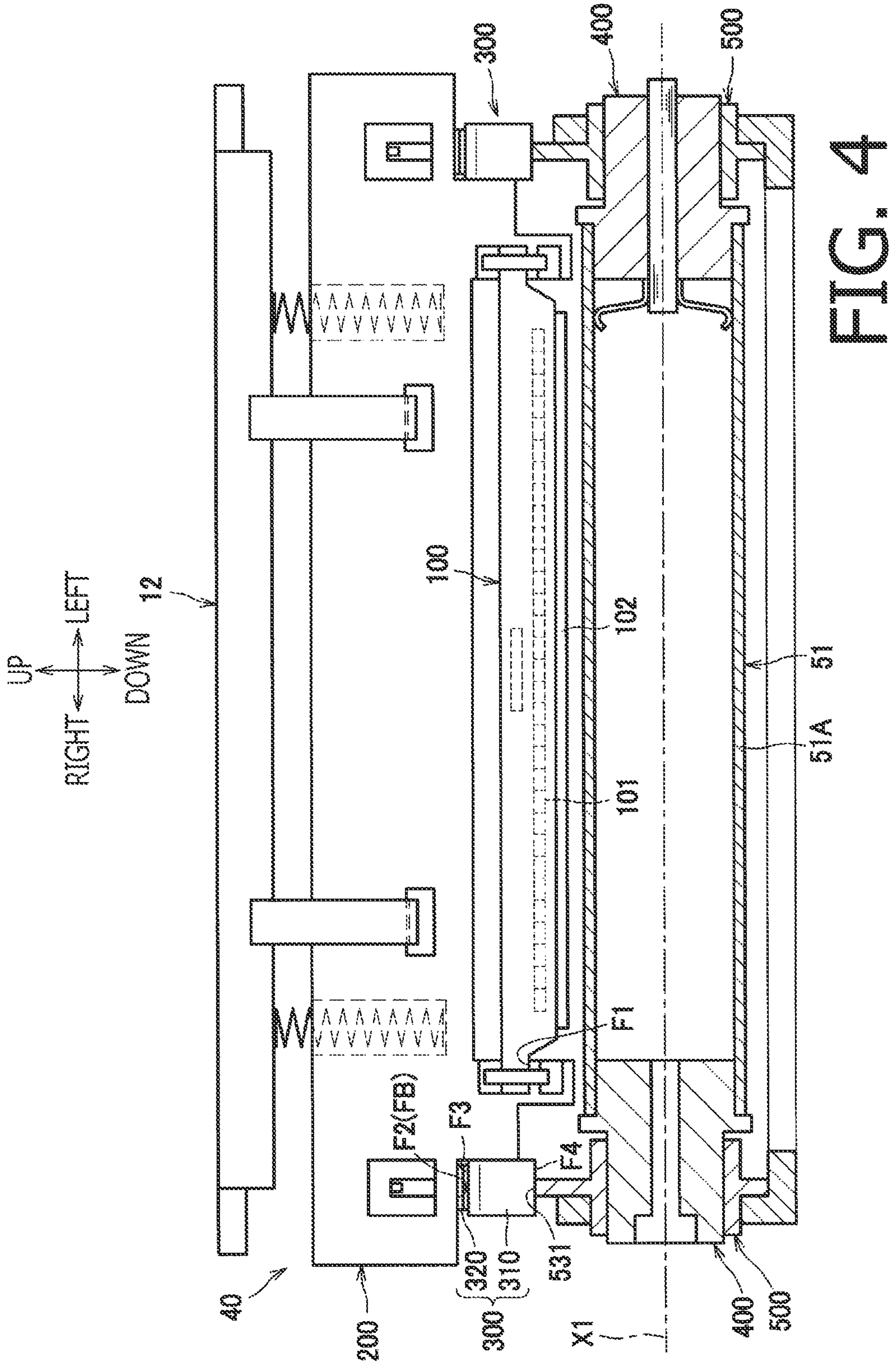
FIG. 4 is an illustrative view of the exposure head being at an exposable position and the drum unit according to the embodiment of the present disclosure.

A lower face of the supporting wall 214 forms a second supporting face F2, which may support the gap-adjusting member 300 from above when the exposure head 40 is in the exposable position (see FIG. 4). The second supporting face F2 is located at a position farther than a first supporting face F1, which will be described later in detail, from the rotation axis X1. The second supporting face F2 may serve as a reference face FB, based on which thickness of a sheet-like spacer 320 may be determined. The reference face FB is provided on a lower side of the supporting wall 214, or on a lower side of the base portion 210, facing toward the photosensitive drum 51A, or the rotation axis X1.

The protrusive portions 220 protrude from a lower face of the base portion 210 toward the photosensitive drum assembly 51. In particular, the protrusive portions 220 protrude downward beyond the lens array 102, to be closer to the photosensitive drum 51A than the lens array 102 with regard to the optical axis direction. Each protrusive portion 220 is arranged at a position between the compressive coil spring SP and the gap-adjusting member 300 with regard to the widthwise direction.

Each protrusive portion 220 includes a third recess 223 and a fourth recess 224, which are open toward one side in the front-rear direction. In particular, the third recess 223 and the fourth recess 224 may be open rearward. The third recess 223 is formed at an upper position in the protrusive portion 220 and may accommodate the extended portion 120 in the first frame 100. A lower wall of the third recess 223 forms a supporting wall 221 to support the extended portion 120 of the first frame 100. An upper face of the supporting wall 221 forms the first supporting face F1 to support the extended portion 120 of the first frame 100 from below. The first supporting face F1 faces outward with regard to the radial direction of the photosensitive drum 51A. In this regard, the first supporting face F1 supports the first frame 100 on a side of the first frame 100 facing toward the photosensitive drum 51A. The first supporting face F1 is arranged between the photosensitive drum 51A and the first frame 100 along the optical axis direction.

A part of the protrusive portion 220 is located at a position coincident with the first supporting face F1 with regard to the rotation axis direction. In other words, an end face 225 (see FIG. 6) of the protrusive portion 220 facing toward the photosensitive drum 51A spreads orthogonally to the optical axis direction and overlaps the first supporting face F1 in a view along the optical axis direction.

Figure 6:
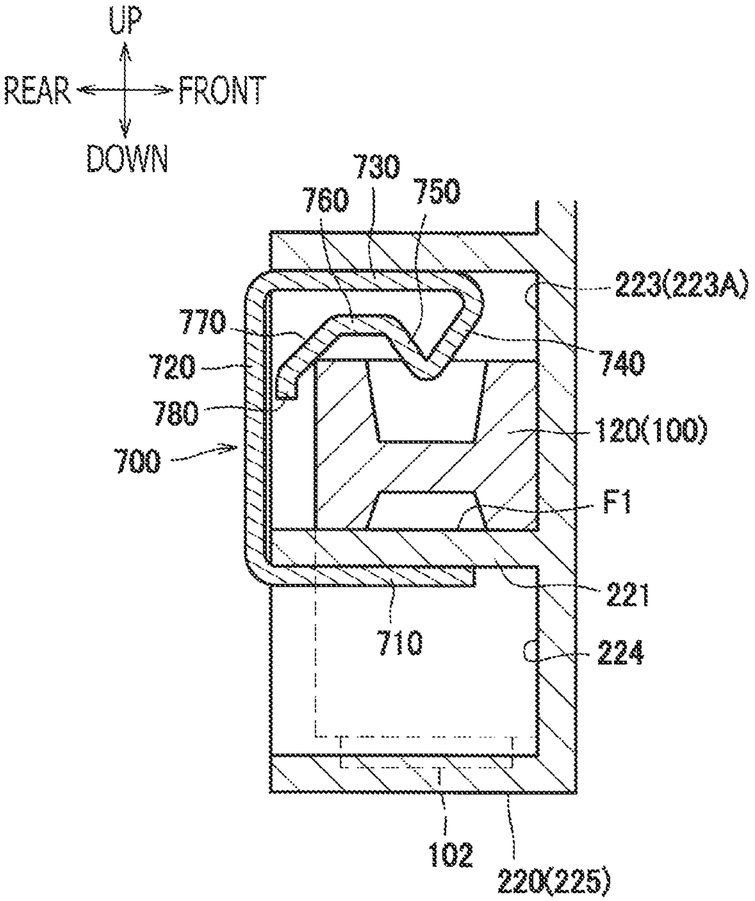
FIG. 6 is a cross-sectional view of a resin spring and neighboring parts for the drum unit according to the embodiment of the present disclosure.

The fourth recess 224 is formed at a lower position with respect to the third recess 223. The supporting face 221 to support the extended portion 120 of the first frame 100 is located between the third recess 223 and the fourth recess 224. As shown in FIG. 6, the extended portion 120 of the first frame 100 supported on the supporting face 221 may be fixed to the protrusive portion 220 through a resin spring 700. The resin spring 700 may be attached to the extended portion 120 and the protrusive portion 220 from the rear so that the resin spring 700 may be prevented from being easily touched or removed by a user.

The resin spring 700 may press the extended portion 120 of the first frame 100 against the first supporting face F1 and a vertical face 223A in the third recess 223. The resin spring 700 includes a first portion 710, a second portion 720, a third portion 730, a fourth portion 740, a fifth portion 750, a sixth portion 760, a seventh portion 770, and an eighth portion 780, which are formed integrally.

The first portion 710 is arranged in the fourth recess 224 to contact a lower face of the supporting wall 221 while an end of the first portion 710 on one side, e.g., a rearward side, with regard to the front-rear direction, stays outside the fourth recess 224. The second portion 720 extends upward from the rearward end of the first portion 710. The third portion 730 extends from an upper end of the second portion 720 frontward toward the vertical face 223A of the third recess 223. The fourth portion 740 extends from an end, e.g., a frontward end, of the third portion 730 on the other side, e.g., a frontward side, obliquely with respect to the third portion 730 to be closer to the second portion 720 and the first portion 710, e.g., lower-rearward. The fifth portion 750 extends from an end, e.g., a lower-rearward end, of the fourth portion 740 obliquely with respect to the third portion 730 to be closer to the third portion 730 and the second portion 720, e.g., upper-rearward. The sixth portion 760 extends from an end, e.g., a rearward end, of the fourth portion 740 on the one side with regard to the front-rear direction in parallel with the third portion 730 to be closer to the second portion 720, e.g., rearward. The seventh portion 770 extends from an end, e.g., a rearward end, of the sixth portion 760 on the one side, e.g., a rearward side, obliquely with respect to the third portion 730 to be closer to the second portion 720 and the first portion 710, e.g., lower-rearward. The eighth portion 780 extends downward from an end, e.g., a lower end, of the seventh portion 770. The seventh portion 770 is arranged to contact an edge of the extended portion 120 of the first frame 100 to press the extended portion 120 against the first supporting face F1 and the vertical face 223A of the third recess 223.

As shown in FIG. 6, a dimension of the protrusive portion 220 in the front-rear direction is greater than a dimension of the lens array 102 in the front-rear direction. In other words, the lens array 102 is arranged within a range of the protrusive portion 220 with regard to the front-rear direction.

Figure 5:
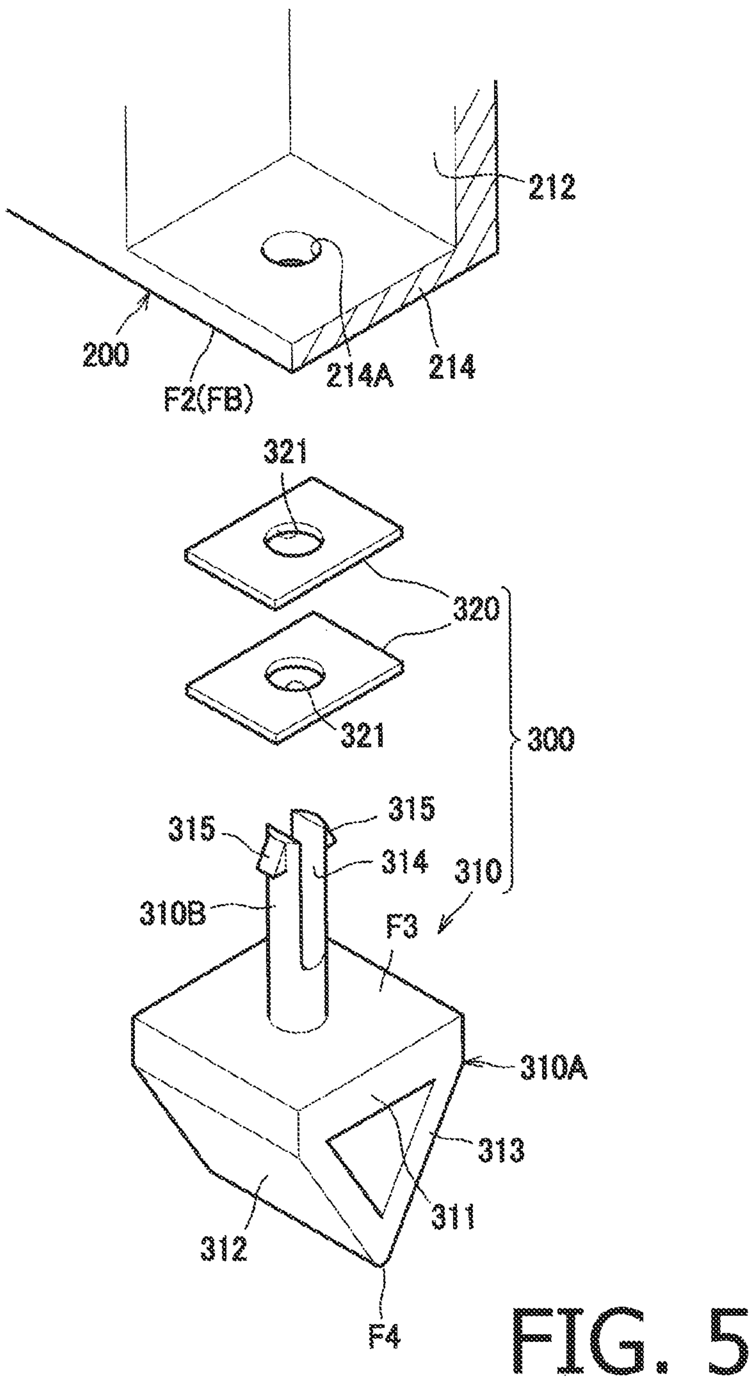
FIG. 5 is an exploded view of a gap-adjusting member for the drum unit according to the embodiment of the present disclosure.

Meanwhile, as shown in FIG. 5, each gap-adjusting member 300 includes a contact member 310 and a plurality of, e.g., two (2), sheet-like spacers 320. The contact member 310 may contact the first contact face 531 (see FIG. 3) in the bearing 500 to define a distance between the lens array 102 and the photosensitive drum 51A in the optical axis direction.

The contact member 310 is made of resin. The contact member 310 includes a solid spacer 310A, which is an approximately triangular-shaped block in a view along the rotation axis direction, and a boss 310B, which protrudes upward from the solid spacer 310A, integrally. The solid spacer 310A is tapered in the front-rear direction to be smaller toward the photosensitive drum assembly 51, i.e., pointing downward at the photosensitive drum assembly 51. In other words, a dimension of the solid spacer 310A in the front-rear direction is reduced to be smaller toward the photosensitive drum assembly 51.

The solid spacer 310A includes a first wall 311, a second wall 312, and a third wall 313. The first wall 311 includes an opposing face F3, which faces toward the second supporting face F2 of the second frame 200, i.e., the reference face FB, along the optical axis direction. The second wall 312 extends from one end of the first wall 311 on one side with regard to the front-rear direction obliquely downward and toward the other side with regard to the front-rear direction. The third wall 313 extends from the other end of the first wall 311 on the other side with regard to the front-rear direction obliquely downward and toward the one side with regard to the front-rear direction to be connected with a lower end of the second wall 312 at a lower end thereof. The lower end of the solid spacer 310A, where the lower end of the second wall 312 is connected with the lower end of the third wall 313, forms a second contact face F4, which is a rounded end protruding downward and extending in the widthwise direction. The second contact face F4 may move along with the top cover 11 to contact the first contact face 531 of the bearing 500.

The boss 310B is a rod protruding upward from the opposing face F3. The boss 310B may have an approximately cylindrical outline. The boss 310B is inserted in a through hole 214A formed in the supporting wall 214. The through hole 214A is formed through the supporting wall 214 vertically. In this regard, the reference face FB has an opening, which is open toward the rotation axis X1. The boss 310B inserted in the through hole 214A is supported by the supporting wall 214 to be vertically movable. In other words, the contact member 310 may be supported by the supporting wall 214 through the boss 310B.

The boss 310B includes a slit 314, which is elongated downward from an upper face of the boss 310B. The slit 314 is open upward and formed through the boss 310B along the widthwise direction. Therefore, an upper part of the boss 310B is bifurcated into two branches, which align along the front-rear direction.

On an outer circumferential surface of an upper portion of the boss 310B, formed are two (2) claws 315, which protrudes outward in the front-rear direction. The claws 315 are engageable with an upper surface of the supporting wall 214. Each claw 315 is tapered to be smaller with regard to a protrusive amount from the outer circumferential surface of the boss 310B in the front-rear direction toward an upper end thereof. In other words, outward faces of the claw 315 with regard to the front-rear direction incline upper-inward and lower-outward.

Therefore, the boss 310B may be pushed upward in the through hole 214A formed in the supporting wall 214 while the bifurcated branches in the upper part of the boss 310B may be resiliently deformed inward, and the claws 315 may enter the through hole 214A. Once the claws 315 are pushed through the through hole 214A, the bifurcated branches may recover to the original shapes, and the claws 315 may be engaged with the upper face of the supporting wall 214.

Each of the sheet-like spacers 320 may be a piece of rectangular plate, which is interposed between the reference face FB and the opposing face F3 of the contact member 310. The sheet-like spacers 320 are arranged to spread orthogonally to the optical axis direction. The sheet-like spacers 320 are formed in a same thickness, i.e., a dimension in the optical axis direction, which may be, for example, in a range between 0.025 mm and 0.2 mm, or more preferably, between 0.05 mm and 0.1 mm.

A dimension of the sheet-like spacers 320 in the front-rear direction may be smaller than a dimension of the opposing face F3 in the front-rear direction. A dimension of the sheet-like spacers 320 in the widthwise direction may be smaller than a dimension of the opposing face F3 in the widthwise direction. The sheet-like spacers 320 have holes 321, through which the boss 310B may penetrate.

The gap-adjusting members 300, as shown in FIG. 3, hang down from the second frame 200 to be supported by the second frame 200 when the exposure head 40 is at the retracted position. In particular, while the contact members 310 hang down from the second frame 200 to be supported by the second frame 200, the sheet-like spacers 320 are stacked on the contact member 310 at positions spaced apart vertically from the second frame 200. In this regard, a distance between the reference face FB and the opposing face F3 may be set at a dimension, in which a maximum assumable number of sheet-like spacers 320 may be stacked. The maximum assumable number of sheet-like spacers 320 may be determined or adjusted by, for example, a manufacturer in consideration of potential manufacturing errors.

Meanwhile, when the exposure head 40 is at the exposable position, as shown in FIG. 4, the sheet-like spacers 320 are interposed between the reference face FB and the opposing face F2. In particular, as the exposure head 40 moves from the retracted position toward the exposable position, the contact members 310 may contact the first contact faces 531 of the bearings 500 and may be restrained by the first contact faces 531 from moving further. Meanwhile, the second frame 200 may move with respect to the contact members 310 to approach the contact members 310. When the reference face FB contacts the spacers 302, the second frame 200 may be stopped not to move further, and the exposure head 40 may be located at a correct position in the optical axis direction. Meanwhile, the second contact faces F4 are located at positions closer than the first supporting faces F1 to the rotation axis X1.

Figure 7:
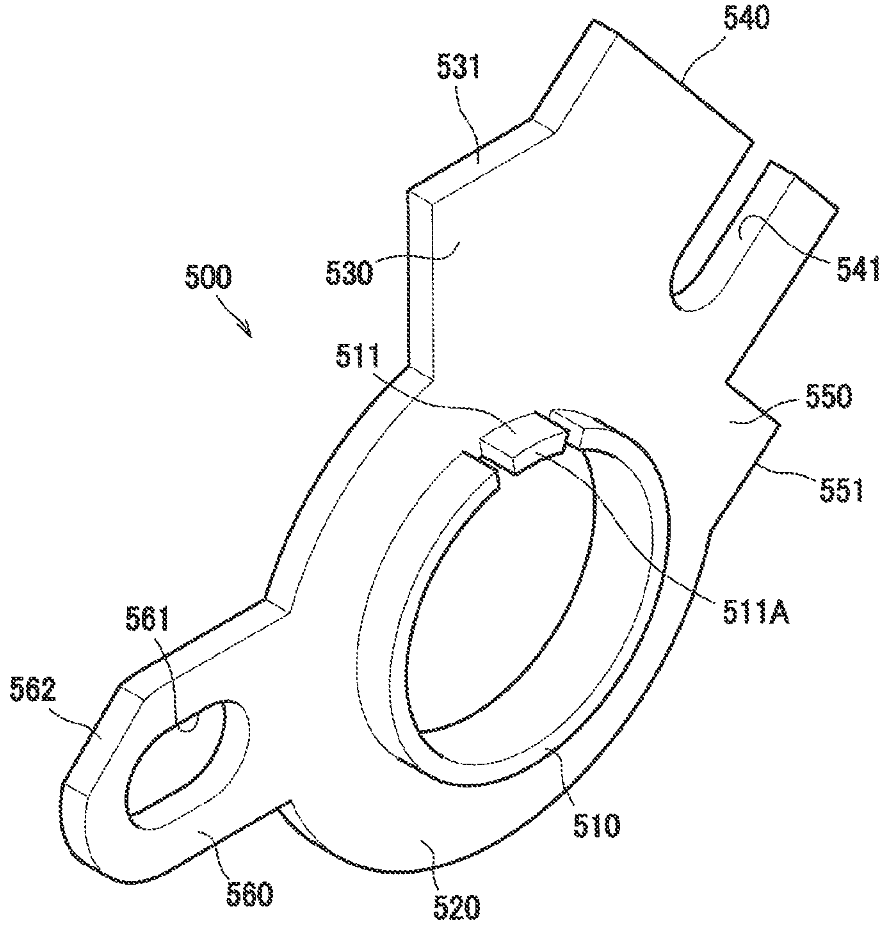
FIG. 7 is a perspective view of a bearing in the drum unit according to the embodiment of the present disclosure.

The bearings 500 are made of resin. As shown in FIG. 7, each bearing 500 includes a bearing portion 510 in a cylindrical shape, a flange portion 520 spreading annularly outward in the radial direction from an approximate center of the bearing portion 510 with regard to the rotation axis direction, an extending portion 530 extending outward in the radial direction of the photosensitive drum 51A (see FIG. 8) from a peripheral area of the flange 520, a guide portion 540, a rotation-regulative portion 550, and a roller-supporting portion 560, which are formed integrally. The flange portion 520, the extending portion 530, the guide portion 540, and the rotation-regulative portion 550 extend outward continuously from the bearing portion 510.

Figure 8:
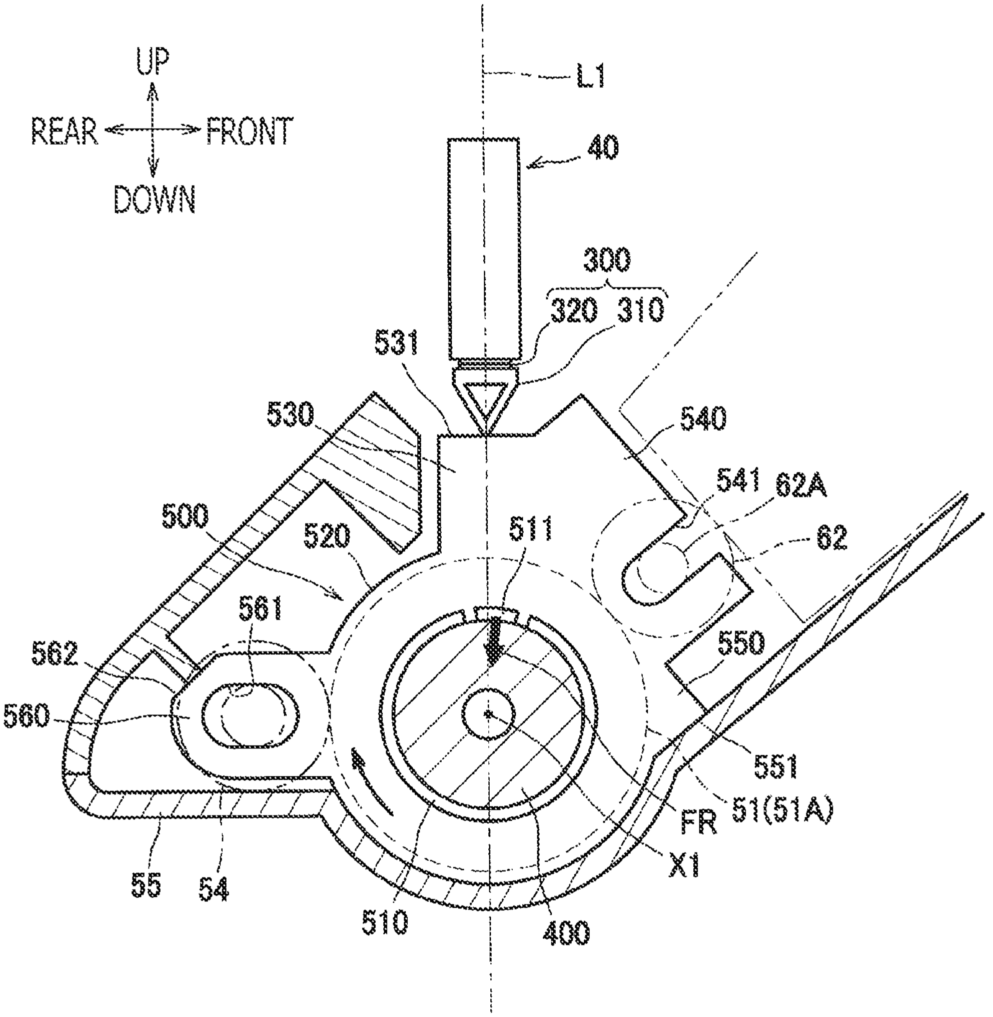
FIG. 8 illustrates positional relation between the bearing and a drum frame in the drum unit according to the embodiment of the present disclosure.

The bearing portion 510 may, as shown in FIG. 8, support the flange 400 rotatably. The bearing portion 510 includes a cantilever 511, which may press the flange 400 toward one side in the radial direction of the photosensitive drum 51A, e.g., downward. The cantilever 511 is a portion arranged between two (2) slits, which are formed on one side of the bearing portion 510, and is resiliently deformable in the radial direction. The cantilever 511 is a resin spring, which inclines with respect to the rotation axis X1 to be closer to the rotation axis X1 at a tip end 511A, to apply an urging force FR to urge the flange 400 in a direction toward the rotation axis X1. The cantilever 511 is located on a line L1, which extends orthogonally to the rotation axis X1 of the photosensitive drum 51A through the first contact face 531 in a view along the rotation axis direction.

The extending portion 530 extends from the flange portion 520 upward toward the contact member 310 in the exposure head 40 to spread in a shape of a plate. The extending portion 530 has the first contact face 531 mentioned earlier at an upper edge thereof. The first contact face 531 forms a plane spreading orthogonally to the optical axis direction. The first contact face 531 may contact the contact member 310 in the exposure head 40 to define the distance between the lens array 102 and the photosensitive drum 51A in the optical axis direction.

The guide portion 540 extends from the flange portion 520 in a direction from the photosensitive drum assembly 51 toward the developing roller 62, e.g., upper-rightward in FIG. 8. The guide portion 540 adjoins the extending portion 530 continuously at a position downstream from the extending portion 530 with regard to the rotating direction of the photosensitive drum 51A. The guide portion 540 has a guide groove 541, which may support the shaft 62A of the developing roller 62 movably in the radial direction of the photosensitive drum 51A.

The rotation-regulative portion 550 adjoins the guide portion 540 continuously at a position downstream from the guide portion 540 with regard to the rotating direction of the photosensitive drum 51A. The rotation-regulative portion 550 includes a first rotation-regulative face 551, which may regulate a position of the bearing 500 with respect to the drum frame 55 within the rotating direction of the photosensitive drum 51A. The first rotation-regulative face 551 is arranged to face downstream with regard to the rotating direction of the photosensitive drum 51A and contact the drum frame 55.

The roller-supporting portion 560 is arranged between the extending portion 530 and the rotation-regulative portion 550 along the rotating direction of the photosensitive drum 51A, at a position apart from the extending portion 530 and from the rotation-regulative portion 550 along the rotating direction of the photosensitive drum 51A. The roller-supporting portion 560 is located at a position opposite to the rotation-regulative portion 550 across the rotation axis X1.

The roller-supporting portion 560 includes a supporting hole 561 to support the cleaning roller 54 rotatably. The roller-supporting portion 560 includes a second rotation-regulative face 562, which may regulate the position of the bearing 500 with respect to the drum frame 55 within the rotating direction of the photosensitive drum 51A. The second rotation-regulative face 562 is arranged to face downstream with regard to the rotating direction of the photosensitive drum 51A and contact the drum frame 55. In order to regulate the position of the bearing 500 with respect to the drum frame 55, not necessarily both but at least one of the first rotation-regulative face 551 and the second rotation-regulative face 562 should contact the drum frame 55 to regulate the position of the bearing 500 with respect to the drum frame 55.

The second rotation-regulative face 562 is located at a position farther than the first contact face 531 from the rotation axis X1 of the photosensitive drum 51A. Meanwhile, the first and second rotation-regulative faces 551, 562 are arranged on one side and the other side, i.e., opposite sides to each other, across the line L1, which extends through the first contact face 531 and the rotation axis X1 of the photosensitive drum 51A in a view along the rotation axis direction.

Next, described below will be an exemplary method to manufacture the color printer 1, in particular, a method to assemble the exposure head 40. In the following description, a method to determine the sheet-like spacers 320 to be adopted may be emphasized. Meanwhile, the sheet-like spacers 320 to be arranged on the one side and the other side, e.g., the leftward side and the rightward side, with regard to the widthwise direction are identical. Therefore, in the following description, the sheet-like spacers 320 to be arranged on the left will represent the overall sheet-like spacers 320, that is, description concerning the sheet-like spacers 320 to be arranged on the right will be omitted.

Figure 9A:
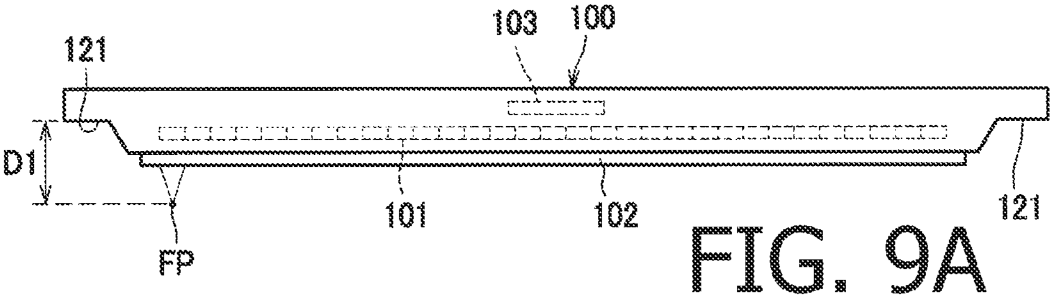
FIGS. 9A-9C illustrate dimensional information required to determine a preferable quantity for sheet-like spacers for the drum unit according to the embodiment of the present disclosure.

As shown in FIG. 9A, initially, the LED array 101, the lens array 102, and the memory 103 may be mounted on the first frame 100. Thereafter, the first frame 100 may be set in a testing device. Thereafter, the LED array 101 may be manipulated to emit light, and a first distance D1 between the supported face 121 of the first frame 100 and a focal point FP may be measured. While the first frame 100 has two (2) supported faces 121, i.e., one on the left and the other on the right, the first distance D1 for each of the two supported faces 121 should be measured. The first distances D1 may be recorded in the memory 103.

Figure 9B:
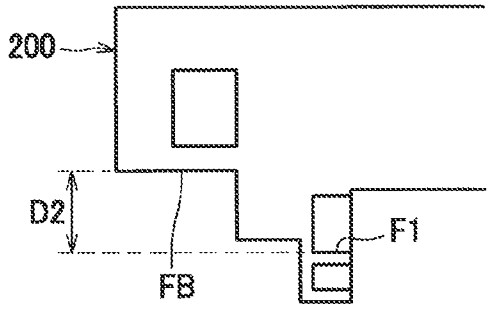

Further, as shown in FIG. 9B, concerning the second frame 200, a second distance D2 between the reference face FB and the first supporting face F1 on one side, e.g., the leftward side, in the second frame 200 may be measured and obtained (Obtaining process). The first supporting face F1 is a plane to support the supported face 121 of the first frame 100. In this regard, the second distance D2 will be equal to a distance between the reference face FB and the first supporting face F1 when the first frame 100 is attached to the second frame 200 later. The second distance D2 for each on the one side and the other sides, e.g., on the left and the right, are measured. With the memory 103 to store the first distances D1, the first distances D1 and the second distances D2 may be measured in separate timings or at separate places.

Thereafter, the first distance D1 to the first frame 100, which is to be attached to the second frame 200, is obtained from the memory 103 (Obtaining process). Based on the obtained first distance D1 and the second distance D2 on the left, a position of a focal point for the exposure head 40 with respect to the reference face FB on the left is obtained (Obtaining process). In particular, by combining the first distance D1 with the second distance D2, a distance D3 (not shown) between the reference face FB and the focal point FP, that is, a position of the focal point for the exposure head 40 with respect to the reference face FB, is calculated and obtained.

Figure 9C:
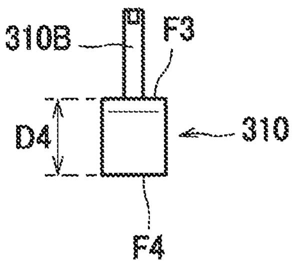

Meanwhile, as shown in FIG. 9C, concerning the contact member 310 to be engaged with the reference face FB on the left, a length D4 between the opposing face F3 and the second contact face F4 in the optical axis direction is measured and obtained (Obtaining process). The distance D4 on the right is obtained likewise.

Thereafter, a number of the sheet-like spacers 320 to be adopted is determined based on the distance D3 corresponding to the position of the focal point FP and the length D4 (Determining process). In particular, a difference between the distance D3 and the length D4 is calculated, and a number N of sheet-like spacers 320 to fill the difference is determined with reference to a dimension T1 of each sheet-like spacer 320 in the optical axis direction. The number N of the sheet-like spacers 320 to be adopted may be determined through an equation [1]: N=(D3−D4)/T1.

The determined number of sheet-like spacers 320 are layered around the boss 310B in the contact member 310, and, thereafter, the contact member 310 with the layered sheet-like spacers 320 is assembled into the second frame 200. Thus, the determined number of sheet-like spacers 320 may be interposed in the position between the reference face FB and the opposing face F2 (Assembling process).

According to the configuration and the method described above, benefits described in the following paragraphs may be achievable.

The first contact face 531 to contact the exposure head 40 is provided in the bearing 500, which supports the flange 400 made of a material different from the material for the photosensitive drum 51A. Therefore, obstacles on the photosensitive drum 51A may not be allowed to enter the gap between the exposure head 40 and the bearing 500 easily. In this regard, without the obstacles, the distance between the lens array 102 and the photosensitive drum 51A in the optical axis direction may be defined and maintained correctly, and the focal point for the exposure head 40 may be restrained from deviating.

The bearing 500 is located on the outer side of the photosensitive drum 51A with regard to the rotation axis direction. Therefore, the first contact face 531 may stay aside from the surface of the photosensitive drum 51A in the rotation axis direction so that the obstacles on the photosensitive drum 51A may be restrained from entering the gap between the first contact face 531 and the exposure head 40 more effectively.

The outer diameter of the cylinder portion 421 in the flange 400 is smaller than the outer diameter of the photosensitive drum 51A. Therefore, for example, compared to a configuration, in which an outer diameter of the cylinder portion 421 is larger than an outer diameter of the photosensitive drum, a contact area between the cylinder portion 421 and the bearing 500 may be reduced. Therefore, abrasion in the cylinder portion 421 and/or the bearing 500 may be restrained.

The flange 400 has the circular flange portion 422; therefore, when the flange 400 is pushed in the photosensitive drum 51A, the flange 400 may be placed in the correct position with respect to the photosensitive drum 51A when the circular flange portion 422 contacts the end face of the photosensitive drum 51A.

The first contact face 531 is arranged at the tip end of the extending portion 530, which extends in the radial direction of the photosensitive drum 51A from the flange portion 520. In other words, the first contact face 531 is arranged at the position extended to be closer to the exposure head 40. In this regard, a protrusive amount for the contact member 310 to protrude downward from the second frame 200 toward the first contact face 531 may be reduced, and the form of the exposure head 40 may be less complicated.

The first contact face 531 is located on the outer side of the surface of the photosensitive drum 51A with regard to the radial direction of the photosensitive drum 51A. Therefore, the first contact face 531 may stay outward from the surface of the photosensitive drum 51A in the radial direction so that the obstacles on the photosensitive drum 51A may be restrained from entering the gap between the first contact face 531 and the exposure head 40 more effectively.

The first contact face 531 is planar, whereas the second contact face F4 is rounded so that the first contact face 531 and the second contact face F4 may contact each other linearly. Therefore, the distance between the lens array 102 and the photosensitive drum 51A in the optical axis direction may be correctly defined.

The first contact face 531 is formed to be planar to spread orthogonally to the optical axis direction, and the exposure head 40 may slide on the first contact face 531 in the sub-scanning direction, which is orthogonal to the optical axis direction. Therefore, when the exposure head 40 is moved to a correct position with respect to the sub-scanning direction, the exposure head 40 may be prevented from being interfered with by the first contact face 531.

The flange 400 and the bearing 500, which are made of resin, may be formed into the preferable shapes easily. Meanwhile, the flange 400 and the bearing 500 may together form a sleeve bearing.

The cantilever 511 formed in the bearing 500 may urge the flange 400 toward one side in the radial direction. Therefore, the distance between the position of the focal point for the exposure head 40 and the surface of the photosensitive drum 51A may be restrained from varying. Further, the cantilever 511 may apply resistance to rotation of the photosensitive drum assembly 51; therefore, unevenness of the rotation of the photosensitive drum assembly 51 may be restrained, and the photosensitive drum 51A may rotate steadily.

The cantilever 511 is located on the line L1, which extends orthogonally to the rotation axis X1 of the photosensitive drum 51A through the first contact face 531 in a view along the rotation axis direction. In this regard, the direction, in which the photosensitive drum assembly 51 is pressed by the cantilever 511 to restrain the rotation unevenness, may coincide with the optical axis direction for the exposure head 40. Therefore, the distance between the lens array 102 and the photosensitive drum 51A in the optical axis direction may be correctly defined.

The inner portion 410 in the flange 400 is arranged outside the exposable range ER for the exposure head 40 with regard to the rotation axis direction. Therefore, while the flange 400 may be tightly fitted in the photosensitive drum 51A, the part of the photosensitive drum 51A coincident with the exposable range ER may be prevented from being deformed by the flange 400.

At the rotation center of the flange 400 on one side, e.g., on the right, arranged is the shaft 610, which is electrically connected with the photosensitive drum 51A. Therefore, the photosensitive drum 51A may be conductive with the main housing 10 through the shaft 610.

The flange 400 on the other side, e.g., on the left, has the drum coupler 402, to which the rotating driving force may be input. Therefore, the rotating driving force may be input to the flange 400 effectively so that the photosensitive drum assembly 51 may be rotated preferably.

The bearings 500 on the right and the left are supported by the drum frame 55; therefore, the photosensitive drum assembly 51 and the bearings 500 may be unitized through the drum frame 55.

The bearing 500 not only has the first contact face 531, based on which the position of the exposure head 40 in the optical axis direction may be defined, but also has the first and second rotation-regulative faces 551, 562. Therefore, the bearing 500 may be restrained from vibrating in the rotating direction so that the position of the focal point for the exposure head 40 may be restrained from deviating.

The second rotation-regulative face 562 is arranged at the position farther than the first contact face 531 from the rotation axis X1 so that the second rotation-regulative face 562 may regulate the rotation of the photosensitive drum assembly 51 at the position farther from the rotation axis X1. Therefore, the rotation of the photosensitive drum 51A may be regulated effectively. Further, an amount of vibration at the second rotation-regulative face 562, i.e., vibration in the rotating direction, may be smaller than an amount of vibration at the first contact face 531. Therefore, the exposure head 40 may be maintained at the correct position by the first contact face 531 effectively.

The first and second rotation-regulative faces 551, 562 are arranged on the opposite sides to each other across the line L1, which extends through the rotation axis X1 of the photosensitive drum 51A and the first contact face 531. Therefore, the vibration of the photosensitive drum 51A in the rotating direction may be effectively restrained.

The roller-supporting portion 560 to support the cleaning roller 54 has the second rotation-regulative face 562; therefore, the cleaning roller 54 may be supported by the roller-supporting portion 560, in which the vibration in the rotating direction may be restrained. Therefore, the cleaning roller 54 may be maintained at a preferable position with respect to the photosensitive drum 51A.

The bearing 500, in which the vibration in the rotating direction may be restrained by the first and second rotation-regulative face 551, 562, has the guide portion 540. Therefore, the developing roller 62 may be maintained at a preferable position in the rotating direction with respect to the photosensitive drum 51A.

The sheet-like spacers 320 are interposed between the reference face FB in the second frame 200 and the contact member 310. Meanwhile, the position of the focal point for the exposure head 40 with respect to the reference face FB may not always be initially correct due to errors that may occur when the items including the first frame 100, the second frame 200, and the contact members 310 are manufactured. However, with the adjusted number of sheet-like spacers 320 interposed between the reference face FB in the second frame 200 and the contact member 310, the position of the focal point may be correctly defined.

Each sheet-like spacer 320 is in a shape of a plate; therefore, the thickness of the sheet-like spacers 320 may be easily controlled, and an amount of an error in the thickness, i.e. the dimension in the optical axis direction, of the sheet-like spacers 320 may be reduced.

The sheet-like spacers 320 are formed in the same thickness; therefore, a worker to assemble the exposure head 40 may easily adjust the position of the focal point by changing the number of sheet-like spacers 320 to be interposed.

The contact member 310 is movable with respect to the second frame 200 in the optical axis direction. When the exposure head 40 is urged toward the photosensitive drum 51A, the second frame 200 may move relatively to the contact member 310, and the sheet-like spacers 320 may be interposed between the reference face FB and the contact member 310. Therefore, for example, compared to a configuration, in which a contact member is fixed to the second frame by screws, such items as the screws may be eliminated, and manufacturing cost may be reduced.

The sheet-like spacers 320 have the holes 321, through which the boss 310B of the contact member 310 may penetrate. Therefore, the sheet-like spacers 320 may be restrained from being displaced from the contact member 31.

With the compressive springs SP to urge the exposure head 40 toward the photosensitive drum 51A, the reference face FB, the sheet-like spacers 320, and the contact member 310 may be urged to contact one another tightly, and the position of the focal point may be correctly defined.

With the gap-adjusting members 300 being urged against the drum unit 50 through the second frame 200, the gap between the exposure head 40 and the photosensitive drum 51A may be maintained. Therefore, the first frame 100 to support the lens array 102 may be prevented from being subject to the stress produced between the gap-adjusting members 300 and the drum unit 50. In other words, the reference face FB may be provided in the second frame 200, which is separate from the first frame 100, while the LED array 101 may be mounted on the first frame 100. Therefore, while the force to urge the exposure head 40 toward the photosensitive drum 51 may be transmitted to the reference face FB, the optical members in the first frame 100 may be prevented from being subject to the force.

The supported face 121 in the first frame 100 is arranged to face a light-emitting face of the lens array 102 and toward the rotation axis X1. Therefore, a correct position of the focal point FP with respect to the supported face 121 may be measured and obtained, and a correct position for the focal point with respect to the reference face FB may be obtained.

The second supporting face F2 is set back to be farther than the first supporting face F1 from the rotation axis X1 so that a protrusive amount for the gap-adjusting member 300 to protrude from the surface of the exposure head 40 facing toward the photosensitive drum 51A (the lower end face of the protrusive portion 220) may be reduced, and the gap-adjusting member 300 may be restrained from being interfered with by neighboring parts or items.

While the first supporting face F1 supports the first frame 100, the protrusive portion 220, which is at the position substantially coincident with the first supporting face with regard to the rotation axis direction, protrudes in the vertical direction to be closer than the lens array 102 to the photosensitive drum 51A. Therefore, the lens array 102 may be protected by the protrusive portion 220 securely.

A width of the protrusive portion 220 in the sub-scanning direction is greater than a width of the lens array 102 in the sub-scanning direction. Therefore, the protrusive portion 220 with the greater width may protect the lens array 102 securely.

The solid spacer 310A in the contact member 310 is tapered to be smaller toward the photosensitive drum 51A. Therefore, when the exposure head 40 is moved to be closer to the photosensitive drum 51A, the contact member 310 may be restrained from being interfered with by neighboring items.

According to the present disclosure, the color printer 1, including the photosensitive drum assembly 51, the exposure head 40, and the bearing 500, is provided. The photosensitive drum assembly 51 includes the photosensitive drum 51A and the flange disposed 400 at the end of the photosensitive drum 51A in the direction of the rotation axis X1 of the photosensitive drum 51A. The flange 400 contacts the inner surface of the photosensitive drum 51A. The exposure head 40 includes the LED array 101 including a plurality of light emitters aligned along the direction of the rotation axis X1, the lens array 102 focusing light from the light emitters on the photosensitive drum 51A, and the head frame to support the LED array 101 and the lens array 102. The bearing 500 includes the first contact face 531 to be in contact with the exposure head 40 to define the distance between the lens array 102 and the photosensitive drum 51A along the direction of the optical axis of the light.

The flange 400 may include the inner portion 410, which is arranged on the inner side of the end face of the photosensitive drum 51A with regard to the direction of the rotation axis X1, and the outer portion 420, which is arranged on the outer side of the end face of the photosensitive drum 51A with regard to the direction of the rotation axis X1. The bearing 500 may contact the outer circumferential surface of the outer portion 420.

The outer portion 420 may include the cylinder portion 421, at which the bearing 500 supports the flange 400. The outer diameter of the cylinder portion 421 may be different from the outer diameter of the photosensitive drum 51A.

The outer diameter of the cylinder portion 421 may be smaller than the outer diameter of the photosensitive drum 51A.

The outer portion 420 may include the circular flange portion 422, of which outer diameter is greater than the outer diameter of the photosensitive drum 51A. The circular flange portion 422 may be arranged to contact the end face of the photosensitive drum 51A.

The inner portion 410 may be arranged outside the exposable range ER for the exposure head 40 with regard to the direction of the rotation axis X1.

The first contact face 531 may be located on the outer side of the outer surface of the photosensitive drum 51A with regard to the radial direction.

The bearing 500 may include the bearing portion 510 having the cylindrical shape and the extending portion 530 having the plate-like shape. The extending portion 530 may extend outward in the radial direction from the bearing portion 510.

The exposure head 40 may include the second contact face F4 configured to contact the first contact face 531. One of the first contact face 531 and the second contact face F4 may be a rounded face, and the other of the first contact face 531 and the second contact face F4 may be a planar face.

The first contact face 531 may be a planar face spreading orthogonally to the direction of the optical axis.

The flange 400 and the bearing 500 may be made of resin. The bearing 500 may be a sleeve bearing.

The bearing 500 may include the cantilever 511 configured to press the flange 400 toward one side in the radial direction.

The cantilever 511 may be located on the line L1 extending orthogonally to the rotation axis X1 of the photosensitive drum 51A through the first contact face 531 in a view along the direction of the rotation axis X1.

The color printer 1 may further include the metal shaft 610 connected with the photosensitive drum 51A. The metal shaft 610 may be arranged at the rotation center of the flange 400.

The flange 400 may include the drum coupler 402, to which the rotating driving force may be input.

The flange 400 may be arranged in each of end areas on one side and the other side of the photosensitive drum 51A. The bearing 500 may be arranged on each of the end areas on the one side and the other side of the photosensitive drum 51A. The color printer 1 may include the drum frame 55 configured to support the bearings 500 on the one side and on the other side.

According to the present disclosure, further, the drum unit 50 having the photosensitive drum assembly 51 and the bearing 500 is provided.

According to the present disclosure, the color printer 1, including the drum unit 50 and the exposure head 40, is provided. The drum unit 50 includes the photosensitive drum 51A. The exposure head 40 includes the LED array 101 having a plurality of light emitters aligned along the direction of the rotation axis X1 of the photosensitive drum 51A, the lens array 102 focusing light from the LED array 101 on the photosensitive drum 51A, the head frame supporting the LED array 101 and the lens array 102, the head frame having the reference face FB facing toward the rotation axis X1, the solid spacer 310A having the opposing face F3, which faces toward the reference face FB, and the second contact face F4, which contacts the drum unit 50, and the sheet-like spacer 320 interposed between the reference face FB and the opposing face F3.

The sheet-like spacer 320 interposed between the reference face FB and the solid spacer 310A may include a plurality of sheet-like spacers 320. The plurality of sheet-like spacers 320 may be formed in the same dimension in the direction of the optical axis of the light from the LED array 101.

The sheet-like spacer 320 interposed between the reference face FB and the solid spacer 310A may include the first sheet-like spacer 320, of which dimension in the direction of the optical axis of the light from the LED array 101 is the first dimension, and the second sheet-like spacer 320, of which dimension in the direction of the optical axis is the second dimension being greater than the first dimension.

The solid spacer 310A may be movably supported by the head frame to move in the direction of the optical axis of the light from the LED array 101.

The reference face FB may include the opening 214A being open toward the rotation axis X1. The solid spacer 310A may include the boss 310B configured to be inserted through the opening 214A to be supported by the head frame. The sheet-like spacer 320 may include the hole 321, through which the boss 310B may penetrate.

The color printer 1 may further include the coil spring SP configured to urge the exposure head 40 toward the photosensitive drum 51A.

The head frame may include the first frame 100, which supports the LED array 101 and the lens array 102, and the second frame 200, which supports the first frame 100. The second frame 200 may include the reference face FB.

The second frame 200 the second frame may support the end portions of the first frame 100 on one side and the other side with regard to the direction of the rotation axis X1.

The first frame 100 may include the supported face 121 configured to be supported by the second frame 200. The supported face 121 may face toward the rotation axis X1.

The drum unit 50 may include the bearing 500 configured to support the photosensitive drum 51A rotatably. The solid spacer 310A may contact the bearing 500.

According to the present disclosure, further, a method to manufacture the color printer 1, is provided. The method includes obtaining the position of the focal point FP of the exposure head 40 with respect to the reference face FB and the length between the opposing face F3 and the second contact face F4 in the direction of the optical axis of the light from the LED array 101, determining the sheet-like spacer 320 to be adopted based on the obtained position of the focal point FP and the obtained length, and assembling the adopted sheet-like spacer 320 into the exposure head 40 at the position between the reference face FB and the opposing face F3.

The exposure head 40 may include the memory 103 configured to store information concerning the position of the focal point FP. In the process to obtain the position of the focal point FP, the information concerning the position of the focal point FP may be obtained from the memory 103.

In the process to obtain the position of the focal point FP, the first distance D1 between the supported face 121 and the focal point FP of the exposure head 40 and the second distance D2 between the reference face FB and the supported face 121 may be obtained, and the position of the focal point FP may be obtained based on the obtained first distance D1 and the obtained second distance D2.

According to the present disclosure, the color printer 1, including the drum unit 50 including the photosensitive drum 51A, the bearing 500 to support the photosensitive drum 51A rotatably, the drum frame 55 to support the bearing 500, and the exposure head 40, is provided. The exposure head 40 includes the LED array 101 including a plurality of light emitters aligned along the direction of the rotation axis X1 of the photosensitive drum 51A, the lens array 102 to focus the light from the LED array 101 on the e photosensitive drum 51A, and the head frame, including the first frame 100 and the second frame 200, to support the LED array 101 and the lens array 102. The bearing 500 includes the first contact face 531 contacting the exposure head 40 to define the distance between the lens array 102 and the photosensitive drum 51A along the direction of the optical axis; and the first and second rotation-regulative faces 551, 562 to regulate the position of the bearing 500 with respect to the drum frame 55 within the rotating direction to the photosensitive drum 51A.

The second rotation-regulative face 562 may be located at the position farther than the first contact face 531 from the rotation axis X1 of the photosensitive drum 51A.

The first and second rotation-regulative faces 551, 562 may be arranged on one side and the other side across the line L1, which extends through the first contact face 531 and the rotation axis X1 of the photosensitive drum 51 along the radial direction of the photosensitive drum 51A in the view along the direction of the rotation axis X1.

The bearing 500 may include the roller-supporting portion 560 to rotatably support a roller, including the cleaning roller 54, which is to contact and rotate on the photosensitive drum 51A. The roller-supporting portion 560 may include the second rotation-regulative face 562.

The color printer 1 may include the developing roller 62 movable in the radial direction of the photosensitive drum 51A. The bearing 500 may include the guide portion 540 to support the developing roller 62 movably.

According to the present disclosure, the drum unit 50, including the photosensitive drum 51A, the bearing 500 to support the photosensitive drum 51A rotatably, and the drum frame 55 to support the bearing 500, is provided. The photosensitive drum 51A is exposable to the light from the exposure head 40, which includes the LED array 101 having a plurality of light emitters to emit the light at the photosensitive drum 51A, the lens array 102 to focus the light from the LED array 101 on the photosensitive drum 51, and the head frame 100, 200. The bearing 500 includes the first contact face 531, which may contact the exposure head 40 to define a distance between the lens array 102 and the photosensitive drum 51A along the direction of the optical axis, and the first and second rotation-regulative faces 551, 562 which may regulate the position of the bearing 500 with respect to the drum frame 55 within the rotating direction to the photosensitive drum 51A.

According to the present disclosure, the color printer 1 including the drum unit 50 and the exposure head 40 is provided. The drum unit 50 includes the photosensitive drum 51A. The exposure head 40 includes the LED array 101 including a plurality of light emitters aligned along the direction of the rotation axis X1 of the photosensitive drum 51A, the lens array 102 to focus the light from the LED array 101 on the photosensitive drum 51A, the first frame 100 to support the LED array 101 and the lens array 102; the second frame 200 to support the first frame 100; and the gap-adjusting member 300 arranged between the second frame 200 and the drum unit 50. The exposure head 40 is movable between the exposable position, in which the photosensitive drum 51 is exposed to the light from the LED array 101, and the retracted position, in which the exposure head 40 is apart farther from photosensitive drum 51A than the exposure head 40 being in the exposable position. The second frame 200 includes the first supporting face F1 to support the first frame 100 and the second supporting face F2 to support the gap-adjusting member 300. The second supporting face F2 is located to be farther than the first supporting face F1 from the rotation axis X1.

The first supporting face F1 may support the first frame 100 on the side of the first frame 100 facing toward the photosensitive drum 51A.

The exposure head 40 may include the resin spring 700 to press the first frame 100 against the first supporting face F1.

The second frame 200 may include the protrusive portion 220 protruding to be closer to the photosensitive drum 51A than the lens array 102. The protrusive portion 220 may be located at the position coincident at least partly with the first supporting face F1 with regard to the direction of the rotation axis X1.

A dimension of the protrusive portion 200 in the sub-scanning direction may be greater than a dimension of the lens array 102 in the sub-scanning direction.

The gap-adjusting member 300 may include the contact member 310 arranged to face toward the second supporting face F2 and to contact the drum unit 50.

The gap-adjusting member 300 may include the sheet-like spacer 320 to be interposed between the second supporting face F2 and the contact member 310.

A dimension of the gap-adjusting member 300 in the sub-scanning direction may decline to be smaller toward the photosensitive drum 51A.

The second contact face F4 of the gap-adjusting member 300 at the end toward the photosensitive drum 51A may be located to be closer than the first supporting face F1 to the rotation axis X1.

The color printer 1 may include the bearing 500 to support the photosensitive drum 51A rotatably. The gap-adjusting member 300 may contact the bearing 500.

Although an example of carrying out the invention has been described, those skilled in the art will appreciate that there are numerous variations and permutations of the image forming apparatus, the drum unit, and the method for manufacturing the image forming apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

Described below will be varied examples derivable from the embodiment described above. In the following examples, items or structures which are substantially the same as or similar to those described in the above embodiment may be denoted by the same reference signs, and description of those may be omitted.

For example, the sheet-like spacers 320 to be interposed between the reference face FB and the solid spacer 310A may not necessarily be formed in the same thickness but may be formed in different thicknesses. For example, a first sheet-like spacer having a first dimension (thickness) in the optical axis direction and a second sheet-like spacer having a second dimension (thickness) being greater in the optical axis direction than the first dimension may be arranged between the reference face FB and the solid spacer 310A. Thereby, the number of the sheet-like spacers to be arranged between the reference face FB and the solid spacer 310A may be restrained from increasing.

The second dimension may be equal to an integer-multiple of the first dimension. For example, the first dimension may be 0.05 mm while the second dimension may be 0.15 mm. With this difference in thickness, by using a combination of at most three (3) sheet-like spacers between the first and the second sheet-like spacers selectively, a gap within a range between 0 mm and 0.35 mm may be filled on basis of 0.05 mm. For another example, a third sheet-like spacer having a third dimension (thickness) being greater in the optical axis direction than the second dimension may further be adopted. For example, the first dimension may be 0.05 mm, the second dimension may be 0.1 mm, and the third dimension may be 0.25 mm. With this difference in thickness, by using a combination of at most two (2) sheet-like spacers among the first, second, and third sheet-like spacers selectively, a gap within a range between 0 mm and 0.35 mm may be filled on basis of 0.05 mm.

For another example, the first distance D1 being the information related to the position of the focal point may not necessarily be stored in the memory 103 mounted on the exposure head 40. For example, the first distance D1 measured in a process to manufacture the first frame 100 may be stored in association with a product number of the first frame 100 in an external storage such as a server. In this manner, in a process where the second frame 200 is manufactured, the first distance D1 associated with the product number of the first frame 100 may be obtained from the external storage.

Meanwhile, if the process to mount the optical members on the first frame 100 and the process to assemble the first frame 100 with the second frame 200 and the gap-adjusting members 300 are conducted consecutively, the first distance D1 and the second distance D2 may be measured and obtained in the respective process.

For another example, the head frame for the exposure head 40 may not necessarily be configured with the plurality of frames including the first frame 100 and the second frame 200 but may be configured with a single head frame to hold the optical members and the gap-adjusting members 300.

If the exposure head should have the single head frame rather than the plurality of frames including the first frame 100 and the second frame 200, the distance D3 between the reference face FB and the focal point FP, which is the position of the focal point for the exposure head 40 with respect to the reference face FB, may be measured, rather than through calculation, and obtained.

For another example, the guide portion 540 may not necessarily movably support the developing roller 62, which may contact the photosensitive drum 51A and rotate on the photosensitive drum 51A. For example, the guide portion 540 may have a separator device, which may move the developing roller 62 between a contact position, in which the developing roller 62 may contact the photosensitive drum 51A, and a separated position, in which the developing roller 62 may be separated from the photosensitive drum 51A.

For another example, the compressive coil spring SP to urge the exposure head 40 toward the photosensitive drum 51A may be replaced with, for example, a blade spring or a torsion spring.

For another example, the contact members 310 may not necessarily be arranged to contact the bearings 500 as long as the contact members 310 may contact the drum unit 50. For example, the contact members 310 may be arranged to contact the drum frame 55, the flanges 400, or the photosensitive drum 51A.

For another example, it may not necessarily be limited to the flanges 400 that are to be rotatably supported in the photosensitive drum assembly 51 by the bearings 500. For example, the bearing 500 may rotatably support the photosensitive drum 51A or shafts that may be fixed at the rotation center of the flanges 400.

For another example, it may not necessarily be limited to the cylindrically-outlined boss 310B that is to be supported in the contact member 300 by the supporting wall 214. For example, the contact member 300 may have a plate-shaped rib.

Figure 10:
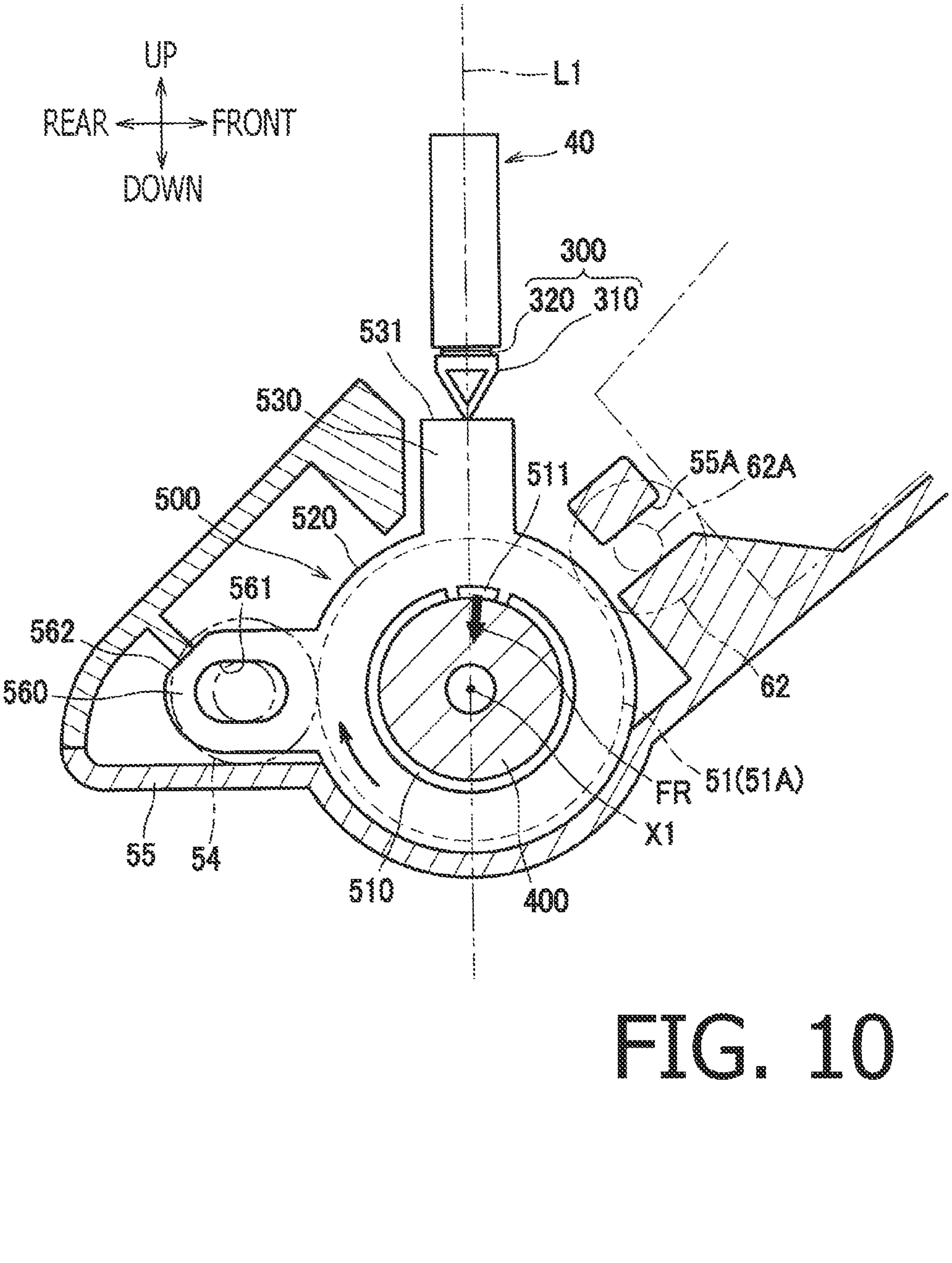
FIG. 10 illustrates a modified example of the rotation-supporting member according to the embodiment of the present disclosure.

For another example, the shaft 62A of the developing roller 62 may not necessarily be supported by the guide portion 540 formed in the bearing 500 to be movable. As shown in FIG. 10, for example, the shaft 62A may be supported by a guide groove 55A formed in the drum frame 55 to be movable in the radial direction of the photosensitive drum 51A. In this regard, the guide portion 540 and the rotation-regulative portion 550 may be omitted from the bearing 500. In other words, as shown in FIG. 10, the bearing 500 may solely have a single rotation-regulative face such as the second rotation-regulative face 562.

For another example, the roller to be rotatably supported by the rotation-regulative face 562 in a roller-supporting portion 560 formed in the bearing 500 may not necessarily be limited to the cleaning roller 54. For example, a charger roller to charge the photosensitive drum 51A may be supported by a rotation-regulative face in a roller-supporting portion formed in the bearing 500.

For another example, the gap-adjusting member 300 may not necessarily be configured with a plurality of parts, including the contact member 310 and the sheet-like spacers 320, but the gap-adjusting member 300 may be formed in a single piece.

For another example, the protrusive portion 220 may not necessarily coincide with the first supporting face F1 with regard to the direction of the rotation axis X1 partly but may entirely coincide with the first supporting face F1 with regard to the direction of the rotation axis X1.

For another example, the resin spring 700 to press the extended portion 120 of the first frame 100 may not necessarily press the extended portion 120 against both the first supporting face F1 and the vertical face 223A of the third recess 223. For example, the resin spring 700 may press the first frame 100 solely against the first supporting face F1. For another example, the resin spring 700 may be replaced with a blade spring or a wire spring made of metal.

For another example, the outer diameter of the cylinder portion 421 may not necessarily be smaller than the outer diameter of the photosensitive drum 51A but may be greater than the outer diameter of the photosensitive drum 51A. As long as the diameter of the cylinder portion 421 is different from the outer diameter of the photosensitive drum 51A, a difference in height may be formed between the outer circumferential surface of the cylinder portion 421 and the surface of the photosensitive drum 51A. Therefore, compared to a configuration, in which the outer circumferential surface of the cylinder portion 421 and the surface of the photosensitive drum 51A align on a same diameter, the obstacles on the photosensitive drum 51A may be restrained from entering between the cylinder portion 421 and the bearing 500. On the other hand, however, the outer circumferential surface of the cylinder portion 421 and the surface of the photosensitive drum 51A may not necessarily be separated by a step but may align on a same diameter.

For another example, the first contact face 531 may or may not spread in parallel with a contact area between the conveyer belt 73 (see FIG. 1) and the photosensitive drum 51A as long as the first contact face 531 spreads orthogonally to the rotation axis X1 of the photosensitive drum 51A.

For another example, the first contact face 531 and the second contact face F4 may not necessarily be in the planar form and the rounded form, respectively, but may be in inverted forms, i.e., the first contact face 531 may be rounded whereas the second contact face F4 may be planar. For another example, the rounded tip may be in a spherical or hemispherical form, by which the first contact face and the second contact face may contact each other at a point.

For another example, the materials for the above-mentioned items, including the flange 400 and the bearing 500, may not necessarily be limited to those mentioned above but may be replaced with other available materials. For another example, the bearing may not necessarily be a sleeve bearing but may be, for example, a ball bearing.

For another example, the present disclosure may not necessarily be applied to the color printer 1 but may be applied to another type of an image forming apparatus including, for example, a copier and a multifunction peripheral machine.

Further, the items and the parts in the configuration of the embodiment described above and the exemplary configuration may be combined arbitrarily or selectively.

The invention claimed is:

1. An image forming apparatus, comprising:
- a drum unit comprising:
  - a photosensitive drum;
  - a first flange arranged on one side of the photosensitive drum in a rotation axis direction of the photosensitive drum, the first flange being fitted to an inner circumferential surface of the photosensitive drum; and
  - a first contact face arranged on a line extending orthogonally to a rotation axis of the photosensitive drum, the first contact face facing outward in a radial direction of the photosensitive drum, and
- an exposure head, comprising:
  - a plurality of light emitters aligned along the rotation axis direction;
  - a lens array focusing light from the light emitters on the photosensitive drum;
  - a head frame supporting the light emitters and the lens array; and
  - a contact member configured to contact the drum unit and define a distance between the lens array and the photosensitive drum along a direction of an optical axis of the light,
- wherein the contact member includes:
  - a second contact face configured to contact the first contact face in the direction of the optical axis; and
  - a cylindrical rod extending in the direction of the optical axis, the cylindrical rod being inserted in a through hole formed in the head frame.

2. The image forming apparatus according to claim 1, wherein
- the exposure head is movable between an exposable position, in which the photosensitive drum is exposed, and a retracted position, in which the exposure head is apart farther from the photosensitive drum than the exposure head being in the exposable position,
- when the exposure head is in the exposable position, the second contact face contacts the first contact face, and when the exposure head is in the retracted position, the second contact face is not in contact with the first contact face.

3. The image forming apparatus according to claim 2, further comprising:
- a housing configured to accommodate the drum unit; and
- a cover movable between a closure position, in which the drum unit is neither attachable to nor detachable from the housing, and an open position, in which the drum unit is attachable to and detachable from the housing,
- wherein, when the cover is located in the closure position, the exposure head is located at the exposable position, and when the cover is located at the open position, the exposure head is located at the retracted position.

4. The image forming apparatus according to claim 1, further comprising a holder located at a position separated from the photosensitive drum by the exposure head, the holder holding the exposure head,
- wherein the holder includes a hook, the hook being configured to hook the holder with the exposure head.

5. The image forming apparatus according to claim 1, wherein
- the through hole is formed in a supporting wall of the head frame, and
- a surface of the supporting wall facing toward the first contact face is farther in the direction of the optical axis from the photosensitive drum than the plurality of light emitters.

6. The image forming apparatus according to claim 1, wherein a distance between the rotation axis and the first contact face is greater than a distance between the rotation axis and an outer circumferential surface of the photosensitive drum.

7. The image forming apparatus according to claim 6, wherein the distance between the rotation axis and the first contact face is greater than a distance between the rotation axis and a light-emitting face of the lens array.

8. The image forming apparatus according to claim 1, wherein the second contact face protrudes toward the rotation axis.

9. The image forming apparatus according to claim 1, wherein one of the first contact face and the second contact face is a rounded face, and the other of the first contact face and the second contact face is a planar face.

10. The image forming apparatus according to claim 1, wherein the first flange includes a coupler, to which a rotating driving force is input.

11. The image forming apparatus according to claim 10, wherein the coupler dents inward along the rotation axis direction from an end of the first flange on the one side of the photosensitive drum in the rotation axis direction.

12. The image forming apparatus according to claim 10, wherein the drum unit further comprises:
- a second flange arranged on the other side of the photosensitive drum in the rotation axis direction, the second flange being fitted to the inner circumferential surface of the photosensitive drum; and
- a metal shaft arranged at a rotation center of the second flange, the metal shaft being arranged in a flange-through hole formed through the second flange, the metal shaft being electrically connected with the photosensitive drum.

13. The image forming apparatus according to claim 12, wherein the drum unit further comprises a ground spring arranged on an inner side of the photosensitive drum, the ground spring electrically connecting the metal shaft and the photosensitive drum.

14. The image forming apparatus according to claim 1, wherein the drum unit further comprises a bearing, the bearing supporting the first flange rotatably, wherein
- the first flange includes an inner portion fitted to the inner circumferential surface of the photosensitive drum and an outer portion arranged on an outer side of the photosensitive drum in the rotation axis direction,
- the outer portion includes a cylinder portion, the cylinder portion being supported by the bearing, and
- an outer diameter of the cylinder portion is smaller than an outer diameter of the photosensitive drum.

* * * * *